US008649019B2

United States Patent
Kannaka et al.

(10) Patent No.: US 8,649,019 B2
(45) Date of Patent: Feb. 11, 2014

(54) SHAPE DETERMINING DEVICE

(75) Inventors: Masato Kannaka, Kobe (JP); Eiji Takahashi, Kobe (JP); Masakazu Kajita, Kobe (JP); Hideki Matsuoka, Kobe (JP); Hidetoshi Tsunaki, Kobe (JP); Noritaka Morioka, Kobe (JP); Kazuhiko Tahara, Kobe (JP); Takuya Atsumi, Kobe (JP)

(73) Assignees: Kobe Steel, Ltd., Kobe-shi, Hyogo (JP); Kobelco Research Institute, Inc., Kobe-shi, Hyogo (JP)

( * ) Notice: Subject to any disclaimer, the term of this patent is extended or adjusted under 35 U.S.C. 154(b) by 291 days.

(21) Appl. No.: 13/138,294

(22) PCT Filed: Jan. 28, 2010

(86) PCT No.: PCT/JP2010/051099
§ 371 (c)(1),
(2), (4) Date: Jul. 28, 2011

(87) PCT Pub. No.: WO2010/087390
PCT Pub. Date: Aug. 5, 2010

(65) Prior Publication Data
US 2012/0002213 A1    Jan. 5, 2012

(30) Foreign Application Priority Data

Jan. 28, 2009 (JP) .............................. P. 2009-016396
Jun. 5, 2009 (JP) .............................. P. 2009-135973

(51) Int. Cl.
*G01B 9/02* (2006.01)
(52) U.S. Cl.
USPC ..................................................... 356/492
(58) Field of Classification Search
USPC .......... 356/491, 492, 495, 498, 503, 511, 482
See application file for complete search history.

(56) References Cited

U.S. PATENT DOCUMENTS

| 5,663,793 | A | 9/1997 | de Groot |
| 2001/0035961 | A1* | 11/2001 | Mitsutani et al. ............. 356/512 |
| 2006/0146340 | A1* | 7/2006 | Szwaykowski et al. ...... 356/495 |

FOREIGN PATENT DOCUMENTS

| DE | 196 35 907 A1 | 3/1997 |
| JP | 61-271431 | 12/1986 |

(Continued)

OTHER PUBLICATIONS

Office Action from Japanese Patent Office for Japanese Patent Application No. 2009-284187, mailed Nov. 20, 2012.

(Continued)

*Primary Examiner* — Tarifur Chowdhury
*Assistant Examiner* — Jonathan Hansen
(74) *Attorney, Agent, or Firm* — Stites & Harbison PLLC; Juan Carlos A. Marquez, Esq.; Nicholas B. Trenkle

(57) ABSTRACT

A shape determining device includes first and second homodyne interferometers respectively provided for front and back surfaces of an object to be measured and a thickness distribution calculator that calculates a thickness distribution of the object based on intensities of first and second interference light beams respectively detected by the first and second homodyne interferometers for the front and back surfaces of the object at a plurality of measurement sites. The thickness distribution calculator calculates, for each interference light beam for which the intensity is detected by the first and second homodyne interferometers, a phase difference between the polarization components of a corresponding reference light beam and a corresponding object light beam in a corresponding non-interference light beam based on the intensity of the interference light beam, and calculates the thickness distribution based on a distribution of the calculated phase differences.

15 Claims, 10 Drawing Sheets

(56) References Cited

FOREIGN PATENT DOCUMENTS

| JP | 2-287107 | 11/1990 |
|---|---|---|
| JP | 7-253303 | 10/1995 |
| JP | 2000-292351 | 10/2000 |
| JP | 2000-329535 | 11/2000 |
| JP | 2006-170796 | 6/2006 |
| JP | 2006-329975 | 12/2006 |
| JP | 2006-349657 | 12/2006 |
| JP | 2008-180708 | 8/2008 |
| JP | 2009-008421 A | 1/2009 |

OTHER PUBLICATIONS

International Search Report for Application PCT/JP2010/051099 mailed Apr. 27, 2010.

Office Action from German Patent Office for German Patent Application No. 11 2010 000 705.5, mailed Jan. 22, 2013.

Xinqun Liu et al., "Polarization Interferometer for Measuring Small Displacement", IEEE Transactions on Instrumentation and Measurement, vol. 50, No. 4, Aug. 2001, pp. 868-871.

Taeho Keem et al., "Simple, real-time method for removing the cyclic error of a homodyne interferometer with a quadrature detector system", App-lied Optics, vol. 44, No. 17, Jun. 10, 2005, pp. 3492-3498.

TaeBong Eom et al., "The dynamic compensation of nonlinearity on a homodyne laser interferometer", Measurement Science and Technology, vol. 12 (2001), pp. 1734-1738.

Office Action from Korean Patent Office for corresponding Korean Application No. 10-2011-7017671, mailed May 31, 2013, 4 pages in Korean and 4 pages of its English translation.

* cited by examiner

PHASE DIFFERENCE Δφ = sin⁻¹ (Wa/Wb)

SHAPE DETERMINING DEVICE

TECHNICAL FIELD

The present invention relates to a shape determining device for measuring thickness distribution and a surface shape of a to-be-measured object by using an interferometer.

BACKGROUND ART

In the shape measurement for a to-be-measured object such as a semiconductor wafer, shape determining devices of non-contact type employing an interferometer are spread widely. In such a device, on the basis of the intensity of an interference light beam where a reference light beam and an object light beam having the same wavelength are superposed, the surface shape of a to-be-measured object, that is, distribution of the surface height (or distribution of the position of the surface), is acquired. Here, a light beam obtained when one of two branched light beams is reflected in the surface of the to-be-measured object is an object light beam, and a light beam obtained when the other light beam is, for example, reflected in a reference surface serving as a reference and is not projected onto the to-be-measured object is a reference light beam.

More specifically, in the surface shape measurement for a to-be-measured object by using an interferometer, an interferometer arranged opposite to the surface of the to-be-measured object detects the intensity of an interference light beam obtained by interference between an object light beam reflected at many measurement sites on the surface of the to-be-measured object and a reference light beam. At that time, at each measurement site, the intensities of plural kinds of interference light beams are detected by a method that the optical path length of the reference light beam is changed or the like so that the difference in the phases of the object light beam and the reference light beam is shifted by a predetermined amount. Then, for each measurement site, the phase difference between the object light beam and the reference light beam is calculated from the intensities of the acquired plural kinds of interference light beams at the measurement site, and then phase connection processing is performed on the basis of the data of phase differences at the plurality of measurement sites. The phase data at each measurement site acquired by this phase connection processing can be converted into a dimension value for the surface height on the basis of the wavelength of the object light beam. Thus, the distribution information of the phase data acquired by the phase connection processing is equivalent to distribution information of the surface height of the to-be-measured object, that is, shape information. Here, the phase connection processing is referred to as unwrapping processing.

By virtue of this, the surface shape of the to-be-measured object can be measured in a non-contact manner. Thus, in comparison with a case of measurement employing a shape measuring instrument of sensing pin type, the surface shape can be measured without causing scratches or the like in the to-be-measured object surface.

Patent reference 1 describes the details of phase connection processing. Patent reference 1 describes a technique of measuring a characteristics change in a fluid accommodated in a cell by detecting a change in the phase of the interference light beam obtained by superposition of an object light beam having passed through the cell and another light beam for reference. At that time, the phase data is sampled with a predetermined period. Further, phase connection processing is performed in which the phase in the phase data at a particular time is shifted by an integral multiple of $2\pi$ such that for the phase data sampled at the particular time point, the phase difference falls within the range from $-\pi$ to $+\pi$ with reference to the phase data at the preceding time point.

Similarly, in the phase connection processing in the shape measurement, correction processing is performed on one phase of the two phase data pieces acquired at two adjacent measurement points. In this processing, correction is performed on the phase at one of the two adjacent measurement points by an integral multiple of $2\pi$ such that the phase difference falls within the range from $-\pi$ to $+\pi$ with reference to the phase at the other point. The phase connection processing performed as described here depends on a premise that the difference between the surface height values at two adjacent measurement points does not exceed ¼ of the wavelength of the object light beam.

Patent reference 2 describes a two-dimensional information acquiring device in which three interference light beams are acquired by the following method.

That is, in the device described in Patent reference 2, a parallel light beam obtained by expanding a laser light beam is projected onto a reference surface and a to-be-measured surface so that a sensing light beam (a non-interference light beam) is acquired that contains a reference light beam and an object light beam as mutually orthogonal polarization components. Further, the sensing light beam is branched into three. Then, from the three branched light beams, the three polarizing plates extract polarization components having mutually different polarization angles, so that three interference light beams are acquired in each of which the phase difference between the components of the reference light beam and the object light beam is shifted by 90°. As such, when the phase shift onto the reference light beam and the object light beam is performed optically by using several polarizing plates whose polarization components to be extracted are different from each other, the plurality of interference light beams having undergone the phase shift are acquired simultaneously. Then, from the intensities of the plurality of interference light beams, the phase difference can be calculated between the reference light beam and the object light beam. Then, distribution of the surface height of the to-be-measured object can be calculated from the distribution of the phase difference.

As such, in the technique described in Patent reference 2, phase shift is performed optically by using polarizing plates in shape measurement according to a phase shift method employing a homodyne interferometer. According to this technique, high-speed measurement can be achieved in comparison with a case of shape measurement according to a general phase shift method in which the position of a reference surface is mechanically moved sequentially so that a changed is generated in the phase difference between the reference light beam and the object light beam.

Patent reference 3 describes a device in which each of two heterodyne interferometers arranged opposite to the front and the back surfaces of a to-be-measured object detect beat signals of interference light beams where the relation between the reference light beam and the object light beam is reversed at a measurement site on the front and the back surfaces of the to-be-measured object, and thereby measure the thickness of the to-be-measured object on the basis of the phase difference between the front and the back beat signals.

PRIOR ART REFERENCE

Patent Reference

Patent reference 1: JP-A-2000-292351
Patent reference 2: JP-A-H02-287107
Patent reference 3: JP-A-2008-180708

SUMMARY OF THE INVENTION

Problems that the Invention is to Solve

Meanwhile, in the shape measurement for a semiconductor wafer (simply referred to as a wafer, hereinafter), the shape over the entire surface need be measured. Thus, in general, the measurement is performed in a state that the edge part of the wafer periphery is supported at plural sites. Nevertheless, when a to-be-measured object like a wafer having a thin plate shape whose thickness is smaller than 1 mm is supported only at the edge part, vibrations are caused in the wafer by a slight wind pressure, vibrations of other machinery, or the like. The amplitude of such vibrations is not negligible in the shape measurement for a wafer where a remarkably high measurement precision, for example, satisfying an error of 20 nm or less, is required.

In the technique described in Patent reference 1, on the basis of the intensity of one interference light beam acquired at one measurement site on one surface of the to-be-measured object, the phase data for the measurement site is derived directly. This has caused a problem that when fluctuation is caused in the phases and the intensities of the reference light beam and the object light beam by external disturbance factors like vibrations in the to-be-measured object, fluctuations in the characteristics of the light source, and a difference in the light reflectivity at each measurement site, the fluctuation directly results in an error in the measurement result and hence shape measuring with precision is not achieved.

Further, in the measurement method described in Patent reference 2, an interference fringe image of interference light obtained by projecting a parallel light beam onto the reference surface and the surface of the to-be-measured object is acquired by a plurality of two-dimensional cameras. Then, in this measurement method, calculation according to a phase shift method is performed by using the pixel data at each corresponding position in the plurality of interference fringe images. Thus, in the measurement method according to Patent reference 2, a difficulty is present in exactly aligning the pixel-to-pixel correspondence relation for the object light beam and the reference light beam having two-dimensional spread and the plurality of acquired images of the interference light beams. Then, discrepancy in the correspondence relation largely affects the measurement error.

On the other hand, in general, it is difficult to adjust with precision the wave surface of a light beam having two-dimensional spread. Thus, the measurement method according to Patent reference 2 has a problem that position adjustment of optical devices necessary for achieving a high measurement precision is extremely difficult.

Further, the measurement method according to Patent reference 2 employs two-dimensional cameras whose operating frequency is approximately 20 Hz to 100 Hz at the highest. Thus, it is difficult to acquire the plurality of interference fringe images simultaneously without time discrepancy. For example, a wafer whose edge part is supported vibrates at a frequency of 50 Hz or the like owing to vibrations generated by devices in the surroundings, a slight air flow, or the like. Nevertheless, when the to-be-measured object vibrates at high speeds as described here, discrepancy in the timing of image acquisition for the plurality of interference fringe images causes substantial degradation in the measurement precision. Thus, the measurement method according to Patent reference 2 has also a problem that this method is not suitable for shape measurement for a to-be-measured object like a semiconductor wafer having a thin plate shape that vibrates at high speeds.

Further, the measurement method according to Patent reference 2 has also a problem that the spatial resolution of the measurement of distribution of the height in the two-dimensional directions over the surface of the to-be-measured object depends on the resolution of the cameras and hence shape measurement with high resolution cannot be performed.

Further, the shape measurement method described in Patent reference 2 has a problem that a measurement error could occur. A reason for this is described below.

Here, in the following description, in the shape measurement method described in Patent reference 2, the paths of the four light beams and signals extending from the optical paths of the sensing light beams (non-interference light beams) generated by branching into four to the output lines of the detectors for the intensities of the interference light beams are referred to as channels. Further, among the four channels, one channel serving as a target of calculation of the phase difference between the object light beam and the reference light beam is referred to as a reference channel. The other three channels are referred to as non-reference channels.

The intensity of the interference light beam acquired by the interferometer is determined by the intensity of the object light beam, the intensity of the reference light beam, and the phase difference between the object light beam and the reference light beam. Thus, in the homodyne interferometer described in Patent reference 2, simultaneous equations hold the contain four relational expressions between the object light beam, the reference light beam, and the intensity and the phase difference of the interference light beam, which are satisfied respectively for the individual channels.

Further, in a case that the homodyne interferometer described in Patent reference 2 is used without undergoing a special calibration process, the intensity of the object light beam and the intensity of the reference light beam do not necessarily agree with each other in each channel. Similarly, the intensity of the object light beam and the intensity of the reference light beam also do not necessarily agree between channels.

Further, a difference in which an unknown error different in each non-reference channel is added to the amount of phase shift (e.g., −90°, +90°, and +180°) expected in advance occurs between the phase difference of the interference light beam of the reference channel and the phase difference of the interference light beam of each of the three non-reference channels.

Thus, in a case that the homodyne interferometer described in Patent reference 2 is used without undergoing a special calibration process, the simultaneous equations contain twelve unknown parameters including the phase differences serving as measurement targets.

For example, phase shifts of −90°, +90°, and +180° relative to the non-interference light beam P2 of the reference channel are imparted respectively to the non-interference light beam P1, P3, and P4 of the three non-reference channels. Nevertheless, even in this case, the actual phase differences of the interference light beams of the three non-reference channels relative to the interference light beam of the reference channel contain individual errors $\epsilon_1, \epsilon_3$, and $\epsilon_4$ and hence are equal to $(-90°+\epsilon_1)$, $(+90°+\epsilon_3)$, and $(+180°+\epsilon_4)$, respectively. Such errors in the phase shifts cannot be neglected when the surface shape of the to-be-measured object is desired to be measured with precision. Nevertheless, reduction of the errors $\epsilon_1, \epsilon_3$, and $\epsilon_4$ to a negligible level causes complexity and a cost increase in the device as well as complexity in calibration operation for the device, and hence is not practical.

The measurement method described in Patent reference 3 requires a large number of optical components in the heterodyne interferometer, and hence has a problem of difficulty in size reduction of the measuring device. Further, in this measurement method, for the devices in the heterodyne interferometer, complexity is present in adjustment of the state of superposition of two kinds of measurement beams like in adjustment of the state of superposition of two measurement beams having mutually different frequencies and in adjustment of the light sources for the two measurement beams and the wave detector for the beat signal. Further, a problem is present that the device is expensive.

Further, another object of the present invention is to, in the measurement of thickness distribution of a to-be-measured object such as a semiconductor wafer having a thin plate shape, provide a shape determining device for measuring thickness distribution with precision by using a simple device configuration without being affected by vibrations of the to-be-measured object.

The present invention has been devised in view of the above-mentioned situations. An object is to, in shape measurement according to a phase shift method employing an interferometer, provide a shape determining device for simply acquiring a measurement result without being affected by an error in the phase shift caused when phase shift is performed optically by using a plurality of polarizing plates.

Means for Solving the Problem

In order to achieve the above-mentioned purpose, the shape determining device according to a first invention of the present invention comprises individual components described in the following (1) and (2).

(1) Two homodyne interferometers each of which detects an intensity of an interference light beam between a reference light beam obtained when emitted light of a predetermined light source is branched into two and then a light beam guided to a front or a back surface of an object arranged at a predetermined measurement position is reflected by a reference surface serving as a reference and an object light beam obtained by reflection at a measurement site in the front or the back corresponding to the front or the back surface in the object and each of which is provided for the front or the back surface of the object.

(2) A thickness distribution calculating unit that calculates thickness distribution of the object on the basis of the intensities of the interference light beams detected at a plurality of the measurement sites by the two homodyne interferometers in a manner of changing a relative position of the object in the two-dimensional directions relative to the two homodyne interferometers.

Further, in the shape determining device according to the present invention, each of the two homodyne interferometers has the individual components described in the following (1.1) to (1.5). Further, the thickness distribution calculating unit has the individual components described in the following (2.1) and (2.2).

(1.1) An optical system for non-interference light beam acquisition that branches the light beam into two and then projects each onto the reference surface and the measurement site, so as to acquire a non-interference light beam that contains the reference light beam and the object light beam as mutually orthogonal polarization components.

(1.2) An optical system for non-interference light beam branching that branches into three or more the non-interference light beam acquired by the optical system for non-interference light beam acquisition.

(1.3) An optical system for phase shift that imparts a change in a phase difference between the orthogonal polarization components by means of a birefringent element for one or more of the three or more branched light beams of the non-interference light beam acquired by the optical system for non-interference light beam branching, so as to generate a diverse phase difference between the polarization component of the reference light beam and the polarization component of the object light beam in each of the three or more branched light beams of the non-interference light beam.

(1.4) An optical system for interference light beam extraction that extracts a polarization component having a common angle with reference to the polarization directions of the reference light beam and the object light beam in the branched light beam, from each of the three or more branched light beams of the non-interference light beam having passed through the optical system for phase shift, and thereby extracts an interference light beam between the reference light beam and the object light beam.

(1.5) An interference light intensity detecting unit that detects an intensity of each of the plurality of interference light beams extracted by the optical system for interference light beam extraction.

(2.1) A phase difference calculating unit that calculates a phase difference between the polarization components of the reference light beam and the object light beam in the non-interference light beam on the basis of the intensity of each of the plurality of interference light beams detected respectively for the front and the back surfaces of the object by the interference light intensity detecting unit.

(2.2) A thickness distribution calculating unit that calculates thickness distribution of the object on the basis of the distribution of the phase difference calculated for the plurality of measurement sites in each of the front and the back surfaces of the object by the phase difference calculating unit.

The two homodyne interferometers used in the first invention can be realized by a remarkably simple and small configuration especially for the light source, the signal processing section, and the like in comparison with the case of heterodyne interferometers.

Further, the interference light intensity detecting unit serving as a photodetector for detecting the intensity of the light beam can operate at much higher speeds than a two-dimensional camera. Thus, the shape determining device according to the present invention can easily detect simultaneously the intensities of a plurality of interference light beams in the front and the back surfaces of the to-be-measured object without time discrepancy. Thus, the shape determining device according to the present invention is preferable also for thickness measurement for the to-be-measured object like a semiconductor wafer that has a thin plate shape whose edge portion is supported and that vibrates at high speeds.

Further, in the shape determining device according to the first invention, phase shift onto the orthogonal polarization components of the reference light beam and the object light beam is optically achieved through a birefringent element. Thus, for each measurement site, a plurality of interference light beams having undergone phase shift are simultaneously acquired from one non-interference light beam serving as an origin. Then, from the intensities of the plurality of interference light beams, the phase difference can be calculated between the reference light beam and the object light beam. Then, distribution of the thickness of the to-be-measured object can be calculated from the distribution of the phase difference. Further, the phase difference can be calculated from relative evaluation of the intensities of the plurality of interference light beams obtained from the one non-interference light beam serving as an origin, and hence is hardly affected by external disturbance factors like fluctuations in the characteristics of the light source of the light beam and differences in the surface angle and the light reflectivity at each measurement site.

Further, external disturbances like differences in the surface angle at each measurement site and slight changes in the holding angles for the optical devices such as the mirrors and the beam splitters cause a change in the angle, the superposition condition, or the like of the optical axes of the reference light beam and the object light beam. This change results in a change in the phase difference between the reference light beam and the object light beam in the plurality of interference light beams. In such a situation, when extraction of a plurality of interference light beams is performed by extraction of polarization components having mutually different angles as described in Patent reference 3, a change in the phase difference between the reference light beam and the object light beam caused by external disturbances is reflected in opposite directions in the plurality of interference light beams. Then, when the phase difference is calculated by relative evaluation of the intensities of the plurality of interference light beams, the change in the phase difference between the reference light beam and the object light beam caused by the external disturbances directly results in an error in the phase difference calculation.

In contrast, in the first invention, the plurality of interference light beams used in the calculation of the phase difference are light beams obtained by extracting polarization components having a common angle with reference to the polarization directions of the reference light beam and the object light beam in each branched light beam form the plurality of branched light beams of the non-interference light beam. That is, in the present invention, the polarization components to be extracted from the branched light beam of the non-interference light beam for the purpose of acquiring a plurality of interference light beams are unified to those of any one of +45° and −45°. Thus, the change in the phase difference between the reference light beam and the object light beam caused by external disturbances is reflected in the same direction in the plurality of interference light beams. Then, when the phase difference is calculated by relative evaluation of the intensities of the plurality of interference light beams, each change in the phase difference between the reference light beam and the object light beam caused by the external disturbances is canceled out in the stage of calculation of the phase difference. Thus, the error in the measurement can be reduced.

Further, according to the present invention, when a light beam having a small spot diameter densely scans the surface of the to-be-measured object, the spatial resolution can be improved in the measurement of thickness distribution in the two-dimensional directions over the surface of the to-be-measured object.

Further, as for more detailed requirements, the shape determining device according to the first invention may satisfy the conditions described in (c1) to (c3).

(c1) The optical system for non-interference light beam branching branches the non-interference light beam into a first branched light beam, a second branched light beam, a third branched light beam, and a fourth branched light beam by two steps of into-two branching.

(c2) The optical system for phase shift imparts each change of −¼ wavelength, +¼ wavelength, and +½ wavelength to the phase difference between the polarization component of the reference light beam and the polarization component of the object light beam in each of the first branched light beam, the third branched light beam, and the fourth branched light beam with reference to the second branched light beam.

(c3) The phase difference calculating unit applies into the following equation (F1) the detected intensities I1, I2, I3, and I4 of the interference light beams for the first branched light beam having received the phase difference change of −¼ wavelength, the second branched light beam adopted as a reference, the third branched light beam having received the phase difference change of +¼ wavelength, and the fourth branched light beam having received the phase difference change of +½ wavelength for each of the front and the back surfaces of the object, and thereby calculates a phase difference Φ between the polarization components of the reference light beam and the object light beam in the non-interference light beam.

$$\Phi = \tan^{-1}[(I2-I4)/(I3-I1)] \tag{F1}$$

Here, as for the detected intensities I1, I2, I3, and I4 of the interference light beams, values are employed that have been adjusted in advance such that an offset and an amplitude of intensity of each of change are identical when a fluctuation is imparted to the phase difference between the polarization components of the reference light beam and the object light beam.

As such, according to the present invention, the phase difference Φ can be calculated by remarkably simple calculation.

Here, an exemplary method of adjusting such that the offsets and the amplitudes of the detected intensities I1, I2, I3, and I4 of the interference light beams become equal to each other is as follows.

That is, a displacement greater than or equal to ½ wavelength of the light beam is generated at the position of the reference surface or at the position of the to-be-measured object or an alternative object for calibration. Then, the detection gain of the interference light intensity detecting unit is adjusted such that the center levels and the fluctuation ranges of fluctuation of the intensities of the plurality of interference light beams acquired by the interference light intensity detecting unit become equal to each other. Alternatively, detection values from the interference light intensity detecting unit are corrected.

Further, it is more preferable that in the two homodyne interferometers, the optical path length of each branched light beam obtained by branching from the non-interference light beam is set equal to each other.

Thus, the influence of external disturbances in the optical path of each branched light beam obtained by branching from the non-interference light beam is reflected to the same extent to each of the plurality of interference light beams. Accordingly, in the stage of calculation of the phase difference by relative evaluation of the intensities of the plurality of interference light beams, the cancellation of the changes in the phase difference between the reference light beam and the object light beam caused by the external disturbances becomes more effective, and hence the error in the phase difference calculation can be reduced further.

Further, it is more preferable that each of the two homodyne interferometers has a component described in the following (1.6).

(1.6) A condenser lens that is arranged in an optical path of the light beam and the object light beam which is its reflected light beam between the optical system for non-interference light beam acquisition and the measurement site and that has a focal point at the measurement site.

By virtue of this, the size of the spot of projection of a light beam onto the measurement site can be reduced. Further, when the light beam densely scans the surface of the to-be-measured object, the spatial resolution can be further improved in the measurement of thickness distribution in the two-dimensional directions over the surface of the to-be-measured object. Further, even when a slight difference is present in the surface angle at each measurement site, the operation of the condenser lens suppresses the deviation of the optical axis of the object light beam which is the reflected light beam from the measurement site. This suppresses reduction in the received light intensity of the object light beam and degradation in the interference efficiency caused by the deviation of the optical axis of the object light beam.

Further, the shape determining device according to a first embodiment of a second invention of the present invention comprises: an optical system for non-interference light beam branching that branches into four non-interference light beams that contains as polarization components an object light beam obtained by reflection by an object arranged at a predetermined measurement position and the other reference light beams; an optical system for phase shift that generates a diverse phase difference between the polarization component of the reference light beam and the polarization component of the object light beam in each of the four branched light beams of the non-interference light beam; four polarizing plates each of which extracts an interference light beam between the reference light beam and the object light beam from each of the four branched light beams of the non-interference light beam having passed through the optical system for phase shift; a light intensity detecting unit that detects an intensity of each light beam having passed through each of the four polarizing plate; a light intensity correcting unit that performs correction independently onto each of the four light intensities acquired by the light intensity detecting unit; a polarizing plate holding unit that holds the polarizing plate at a variable angle; a light beam blocking unit that blocks each of the object light beam and the reference light beam; a gain setting unit that sets up a correction gain for the light intensity correcting unit such that, when a time series of fluctuations is imparted to the optical path length of the object light beam or the reference light beam in a first arrangement state that an object for calibration is arranged at the measurement position, the amplitude of the time series change in the intensity of each of the four interference light beams corrected by the light intensity correcting unit agree with each other; a phase shift error calculating unit that, when a time series of fluctuations is imparted to the optical path length of the object light beam or the reference light beam in the first arrangement state, calculates an error in the phase shift by the optical system for phase shift on the basis of the intensity information of each of the four interference light beams corrected by the light intensity correcting unit; and a phase difference calculating unit that, in a second arrangement state that the to-be-measured object is arranged at the measurement position, calculates a phase difference between the object light beam and the reference light beam for the to-be-measured object on the basis of the intensity of the interference light beam corrected by the light intensity correcting unit and the calculation result of the phase shift error calculating unit.

An example of more detailed contents of the optical system for phase shift and the phase difference calculating unit according to a first embodiment of the second invention is as follows.

For example, in the optical system for phase shift, among the non-interference light beams obtained by branching into four, a phase difference of each of three of the non-interference light beams serving as a source of a non-reference interference light beam relative to one of the non-interference light beams serving as a source of a reference interference light beam is set to be each of $-90°$, $+90°$, and $+180°$.

Then, the phase difference calculating unit applies into the following equations (A1) an intensity $I2'$ of the reference interference light beam and intensities $I1'$, $I3'$, and $I4'$ of the three non-reference interference light beams as well as errors $\epsilon1$, $\epsilon3$, and $\epsilon4$ of the phase shifts of the three non-reference interference light beams, and thereby calculates a phase difference $\phi$ between the object light beam and the reference light beam in the to-be-measured object.

[Mathematical Expression 1]

$$\phi' = \tan^{-1}\left(\frac{I2' - I4'}{I3' - I1'}\right) \quad (A1)$$
$$\phi = \tan^{-1}\left(\frac{\sin\phi' \cdot \{\cos(\epsilon1) + \cos(\epsilon3)\} - \cos(\phi') \cdot \sin(\epsilon4)}{\sin\phi' \cdot \{\sin(\epsilon1) + \sin(\epsilon3)\} + \cos\phi' \cdot \{1 + \cos(\epsilon4)\}}\right)$$

Further, the shape determining device according to the first embodiment of the second invention comprises a polarizing plate holding angle adjusting unit that, as for the detected intensities obtained by the light intensity detecting unit in a state that the optical path length of the object light beam and the reference light beam is maintained at constant in the first arrangement state, adjusts the holding angle of each of the polarizing plates in the polarizing plate holding unit such that the detected intensity of the reference light beam at the time that the object light beam is blocked by the light beam blocking unit and the detected intensity of the object light beam at the time that the reference light beam is blocked by the light beam blocking unit agree with each other.

In the following description, the path of each of the four light beams and signals that extends from the optical paths of the non-interference light beams obtained by branching into four by the optical system for non-interference light beam branching to the output line of the light intensity detecting unit is referred to a channel. Further, among the four channels, one channel serving as a target of calculation of the phase difference between the object light beam and the reference light beam is referred to as a reference channel. The other three channels are referred to as non-reference channels.

Also in the interferometer used in the second invention, similarly to the homodyne interferometer described in Patent reference 2, simultaneous equations hold that contain four relational expressions between the intensities and the phase differences of the object light beam, the reference light beam, and the interference light beam which are satisfied in each channel.

Further, also in the interferometer used in the present invention, similarly to the homodyne interferometer described in Patent reference 2, when the interferometer is used without a special calibration process, the simultaneous equations contain twelve unknown parameters including the phase differences serving as measurement targets.

In such an interferometer, by virtue of the polarizing plate holding angle adjusting unit, the intensity of the object light beam and the intensity of the reference light beam agree with each other in each of the four channels. Further, by virtue of the gain setting unit, the intensities $I1'$ to $I4'$ of the interference light beams corrected (by linear correction) by the light intensity correcting unit become such measured values where the intensity of the object light beam and the intensity of the reference light beam agree between the four channels.

Thus, as described later, simultaneous equations hold that are composed of four equations containing: corrected intensities I1' to I4' of the interference light beams of the four channels acquired by the light intensity correcting unit; one variable common to each channel corresponding to the intensity of the object light beam and the reference light beam; an unknown phase difference φ serving as a calculation target; and errors ϵ1, ϵ3, and ϵ4 of the three unknown amounts of phase shift different for each non-reference channel. Then, in the phase shift error calculating unit, the corrected intensities I1' to I4' of the interference light beams of the four channels are applied into equations derived by removing one variable from the simultaneous equations, so that the errors ϵ1, ϵ3, and ϵ4 in the amounts of phase shift of the non-reference channels can be calculated.

As a result, in the phase difference calculating unit, a phase difference φ not affected by the errors ϵ1, ϵ3, and ϵ4 of the amounts of phase shift can be calculated. Further, it is sufficient that this calibration process is performed once before the shape measurement for the to-be-measured object. Further, the contents of execution are simple.

Further, the shape determining device according to a second embodiment of the second invention comprises: an optical system for non-interference light beam branching that branches into four non-interference light beams that contains as polarization components an object light beam obtained by reflection by an object arranged at a predetermined measurement position and the other reference light beams; an optical system for phase shift that generates a diverse phase difference between the polarization component of the reference light beam and the polarization component of the object light beam in each of the four branched light beams of the non-interference light beam; four polarizing plates each of which extracts an interference light beam between the reference light beam and the object light beam from each of the four branched light beams of the non-interference light beam having passed through the optical system for phase shift; a light intensity detecting unit that detects an intensity of each light beam having passed through each of the four polarizing plate; a light intensity correcting unit that performs correction independently onto each of the four light intensities acquired by the light intensity detecting unit; a light beam blocking unit that blocks each of the object light beam and the reference light beam; a gain setting unit that sets up a correction gain for the light intensity correcting unit such that, when the optical path length of the object light beam is maintained at constant and the reference light beam is blocked by the light beam blocking unit in a first arrangement state that an object for calibration is arranged at the measurement position, the intensities of the four object light beams acquired by the light intensity correcting unit agree with each other; an offset correction value setting unit that sets up, as offset correction values for the light intensity correcting unit, the intensities of the four reference light beams acquired by the light intensity correcting unit when the optical path length of the reference light beam is maintained at constant and the object light beam is blocked by the light beam blocking unit in the first arrangement state; a phase shift error calculating unit that, when a time series of fluctuations is imparted to the optical path length of the object light beam or the reference light beam in the first arrangement state, calculates an error in the phase shift by the optical system for phase shift on the basis of the intensity information of each of the four interference light beams corrected by the light intensity correcting unit; and a phase difference calculating unit that, in a second arrangement state that the to-be-measured object is arranged at the measurement position, calculates a phase difference between the object light beam and the reference light beam for the to-be-measured object on the basis of the intensity information of each of the four interference light beams corrected by the light intensity correcting unit and the calculation result of the phase shift error calculating unit.

An example of more detailed contents of the optical system for phase shift and the phase difference calculating step according to the second embodiment of the second invention is as follows.

For example, in the optical system for phase shift, among the non-interference light beams obtained by branching into four, a phase difference of each of three of the non-interference light beams serving as a source of a non-reference interference light beam relative to one of the non-interference light beams serving as a source of a reference interference light beam is set to be each of −90°, +90°, and +180°.

Further, the phase difference calculating unit applies into the following equations (A2) an intensity I2″ of the reference interference light beam and intensities I1″, I3″, and I4″ of the three non-reference interference light beams as well as errors ϵ1, ϵ3, and ϵ4 of the phase shifts of the three non-reference interference light beams and the offset correction values ar1, ar2, ar3, and ar4 set up by the offset correction value setting unit, and thereby calculates a phase difference φ between the object light beam and the reference light beam in the to-be-measured object.

[Mathematical Expression 2]

$$Z = \frac{I2'' - I4''}{I3'' - I1''} \qquad (A2)$$

$$\phi = \tan^{-1}\left\{\frac{\sqrt{ar4}\cdot\sin(\varepsilon 4) - Z\cdot\left(-\sqrt{ar3}\cdot\cos(\varepsilon 3) + \sqrt{ar1}\cdot\cos(\varepsilon 1)\right)}{Z\cdot\left\{-\sqrt{ar3}\cdot\sin(\varepsilon 3) - \sqrt{ar1}\cdot\sin(\varepsilon 1)\right\} - \sqrt{ar2} - \cos(\varepsilon 4)}\right\}$$

In the interferometer used in the second invention, the linear correction gain setting unit achieves a state that the component of the intensity of the object light beam in the intensity of the interference light beam corrected by the light intensity correcting unit can be regarded as agreeing between the four channels. Further, by virtue of the offset correction value setting unit, the intensities ar1 to ar4 of the reference light beams in the individual channels become known and the intensity of the interference light beam corrected by the light intensity correcting unit becomes a measured value from which the offset component corresponding to the intensity of the reference light beam has been removed.

Thus, as described later, simultaneous equations hold that are composed of four equations containing: corrected intensities I1″ to I4″ of the interference light beams of the four channels acquired by the light intensity correcting unit; one variable common to each channel corresponding to object light intensity; an unknown phase difference φ serving as a calculation target; errors ϵ1, ϵ3, and ϵ4 of the three unknown amounts of phase shift different for each non-reference channel; and intensities ar1 to ar4 of the reference light beams in the individual channels which have become known as a result of the offset correction value setting step. Then, in the phase shift error calculating unit, the corrected intensities I1″ to I4″ of the interference light beams of the four channels are applied into equations derived by removing one variable from the simultaneous equations, so that the errors $\epsilon 1$, $\epsilon 3$, and $\epsilon 4$ in the amounts of phase shift of the non-reference channels can be calculated.

As a result, at the phase difference calculating step, a phase difference $\phi$ not affected by the errors $\epsilon 1$, $\epsilon 3$, and $\epsilon 4$ of the amounts of phase shift can be calculated. Further, it is sufficient that this calibration process is performed once before the shape measurement for the to-be-measured object. Further, the contents of execution are simple.

Effects of the Invention

According to the first invention described above, in the measurement of thickness distribution of a to-be-measured object such as a semiconductor wafer having a thin plate shape, the measure of thickness distribution is achieved with precision without being affected by vibrations of a to-be-measured object by using a simple device configuration.

Further, according to the second invention described above, in the shape measurement according to a phase shift method employing an interferometer, measurement results can simply be acquired without being affected by the errors of the phase shifts caused when phase shift is performed optically by using a plurality of polarizing plates.

MODE FOR CARRYING OUT THE INVENTION

First Invention

Figure 1:
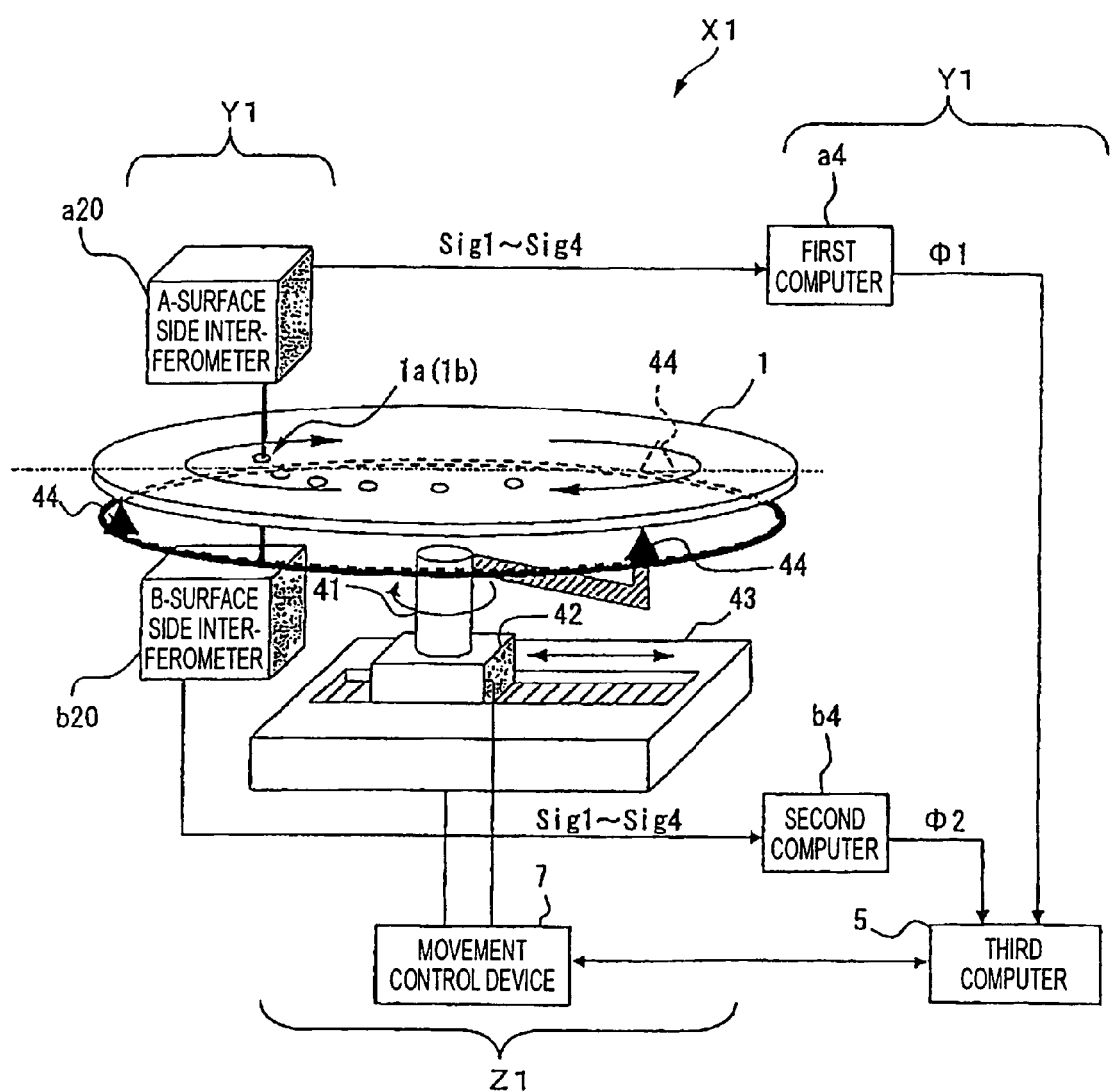
FIG. 1 is a schematic configuration diagram of a shape determining device X1 according to an embodiment of a first invention.

An embodiment of a first invention is described below with reference to the accompanying drawings for the purpose of providing the understanding of the present invention. Here, the embodiment given below is an example of implementation of the present invention and does not restrict the technical scope of the present invention.

A shape determining device X1 according to an embodiment of the first invention is described below with reference to a configuration diagram shown in FIG. 1.

The shape determining device X1 is a device for measuring the thickness distribution of a to-be-measured object 1 such as a semiconductor wafer having a thin plate shape. As shown in FIG. 1, the shape determining device X1 has: an interference light measuring section Y1 including two light interferometers a20 and b20 composed of homodyne interferometers; and a movable support device Z1. Further, the interference light measuring section Y1 has three computers a4, b4, and 5 in addition to the two light interferometers a20 and b20. In the shape determining device X1, a to-be-measured object 1 is supported by the movable support device Z1.

In the following description, for convenience, one surface (the upper surface in FIGS. 1 and 2) of the to-be-measured object 1 is referred to as A surface, and the other surface in the relation of front and back relative to the A surface is referred to as B surface. Further, a measurement site on the A surface of the to-be-measured object 1 is referred to as an A-surface measurement point 1a, and a measurement site on the B surface in a front and back relation corresponding to the A-surface measurement point 1a is referred to as a B-surface measurement point 1b. The light interferometer a20 is arranged on the A surface side of the to-be-measured object 1, and the light interferometer b20 is arranged on the B surface side of the to-be-measured object 1.

The detection signals from the light interferometer a20 on the A surface side and the light interferometer b20 on the B surface side are processed separately by the computer a4 and the computer b4. These are referred to as the first computer a4 and the second computer, respectively. The remaining computer 5 is referred to as the third computer 5.

Each of the three computers a4, b4, and 5 has a CPU, a memory, signal input/output interfaces, and the like. Then, the CPU executes a predetermined program so as to execute: various kinds of calculation; transmission and reception of signals to and from an external device through the signal input/output interfaces; recording of data into the memory; and the like.

The two light interferometers a20 and b20 are optical devices for outputting intensity signals Sg1 to Sg4 of interference light beams obtained by superposition of a reference light beam and an object light beam which are reflected light beams acquired when a light beam is projected onto a reference surface serving as a reference and onto the measurement points 1a and 1b on the front and the back surfaces of the to-be-measured object 1.

Further, the first computer a4 and the second computer b4 executes the processing of calculating the phase differences $\Phi a$ and $\Phi b$ between the reference light beam and the object light beam on the basis of the intensity signals Sg1 to Sg4 of the interference light beams outputted from the light interferometer a20 on the A surface side and the light interferometer b20 on the B surface side. Details of this are described later. Here, the phase difference $\Phi a$ is a phase difference of the object light beam reflected at the A-surface-side measurement point 1a. The phase difference $\Phi b$ is a phase difference of the object light beam reflected at the B-surface-side measurement point 1b.

Further, the third computer 5 executes the processing of calculating the thickness distribution of the to-be-measured object 1 on the basis of the difference ($\Phi a - \Phi b$) distribution of the phase differences Φa and Φb calculated for the A-surface-side measurement point 1a and the B-surface-side measurement point 1b at plural sites.

Details of the individual components provided in the shape determining device X1 are described below.

The movable support device Z1 is a device for supporting the to-be-measured object 1 between the emitting sections for the object light beams from the two light interferometers a20 and b20, and moving the supporting position in the two-dimensional directions. That is, the movable support device Z1 changes the relative position of the to-be-measured object 1 relative to the two light interferometers a20 and b20 in the two-dimensional directions. In the example shown in FIG. 1, the movable support device Z1 moves the to-be-measured object 1 in the horizontal directions.

As shown in FIG. 1, the movable support device Z1 has a revolving shaft 41, a support section 44 linked with this, a revolution drive section 42, a linear movement mechanism 43, and a movement control device 7.

The disk-shaped to-be-measured object 1 such as a semiconductor wafer is supported at three points in the edge part by the support sections 44 arranged at three positions on the circumference. These three support sections 44 are linked with the revolving shaft 41 extending toward the center of the circumference.

Further, the revolving shaft 41 is driven and revolved by the revolution drive section 42 such as a servo motor. By virtue of this, the to-be-measured object 1 revolves around the center part serving as the center of revolution.

Further, the linear movement mechanism 43 linearly moves the revolving shaft 41 and the revolution drive section 42 within a predetermined movement range in a direction parallel to the front and the back surfaces of the to-be-measured object 1, that is, in a direction orthogonal to the thickness direction of the to-be-measured object 1. That is, the linear movement mechanism 43 moves the disk-shaped to-be-measured object 1 along a radial direction.

Further, the movement control device 7 controls the movement of the revolution drive section 42 and the linear movement mechanism 43. Further, the movement control device 7 detects the position of projection of the object light beams onto the to-be-measured object 1, that is, the position of the measurement points 1a and 1b which varies frequently, and then transmits the detection result to the third computer 5. The detection of the position of the measurement points 1a and 1b is performed, for example, on the basis of the history of operating commands to the revolution drive section 42 and the linear movement mechanism 43, that is, on the basis of the movement history of the to-be-measured object 1. Alternatively, the position of the measurement points 1a and 1b may be detected on the basis of the detection results from position detection sensors (not shown) provided respectively in the revolution drive section 42 and the linear movement mechanism 43.

By the simultaneous use of the revolution of the to-be-measured object 1 performed by the revolution drive section 42 and the linear movement of the to-be-measured object 1 performed by the linear movement mechanism 43, the shape determining device X1 sequentially changes the position of the measurement points 1a and 1b in the to-be-measured object 1, that is, the position of the spot of projection of the object light beams. Then, the phase differences Φa and Φb are measured at the plurality of measurement points 1a and 1b.

For example, the movement control device 7 revolves and linearly moves the to-be-measured object 1 continuously at a constant speed, and transmits a data acquisition instruction to the third computer 5 in a constant period or alternatively at each time that the position of the measurement points 1a and 1b is located at a position defined in advance. In response to receiving of the data acquisition instruction, the third computer 5 requests to the first computer a4 and the second computer b4 the calculation of the phase differences Φa and Φb, and then acquires the calculation results. Further, from the distribution of the difference between the phase differences Φa and Φb at the plurality of measurement points 1a and 1b, the third computer 5 calculates the thickness distribution of the to-be-measured object 1.

Figure 3:
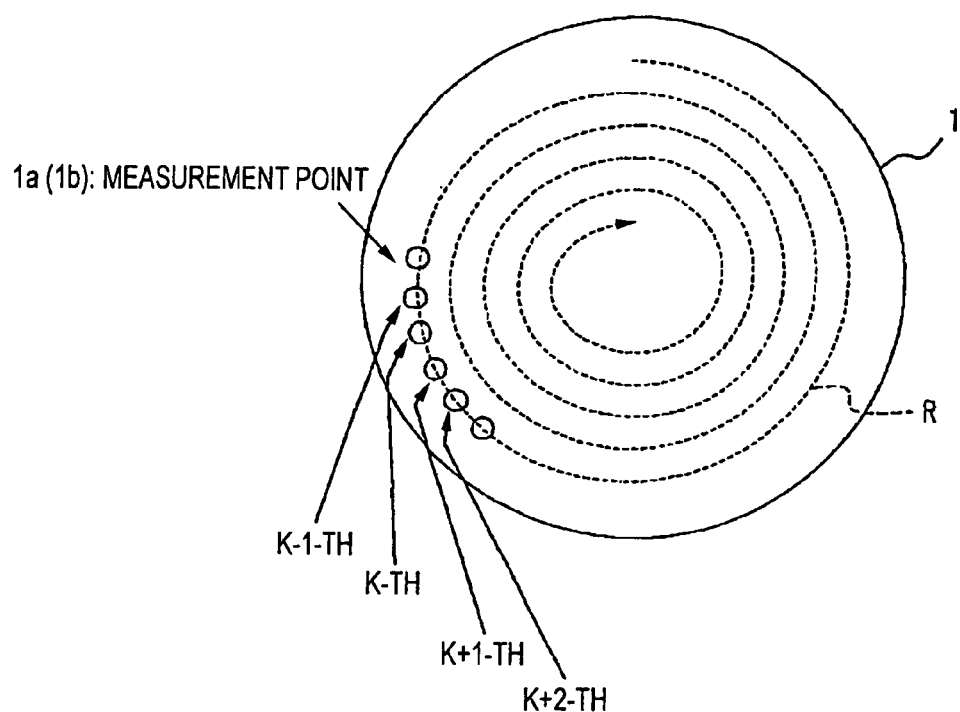
FIG. 3 is a schematic diagram showing an example of distribution of measurement points on the surface of a to-be-measured object in a shape determining device X1.

FIG. 3 is a schematic diagram showing an example of distribution of the plurality of measurement points 1a and 1b on the surface of the to-be-measured object 1 in the shape determining device X1.

When the measurement of the phase differences Φa and Φb is performed sequentially in a state that the to-be-measured object 1 is revolved and linearly moved, as indicated by a dashed line in FIG. 3, the position of the measurement points 1a and 1b varies sequentially along a spiral locus R on the surface of the to-be-measured object 1. The plurality of measurement points 1a and 1b and the phase differences Φa and Φb corresponding to these are identified, for example, by measurement point numbers (1, 2, 3 . . . ) assigned in the order of measurement. FIG. 3 shows the locus of the measurement points 1a and 1b having (K−1)-th to (K+2)-th measurement numbers.

As such, in the shape determining device X1, the object light beams from the two light interferometers a20 and b20 scan along one scanning line R on the to-be-measured object 1.

Next, the interference light measuring section Y1 including the two light interferometers a20 and b20 is described below with reference to the configuration diagram shown in FIG. 2.

Figure 2:
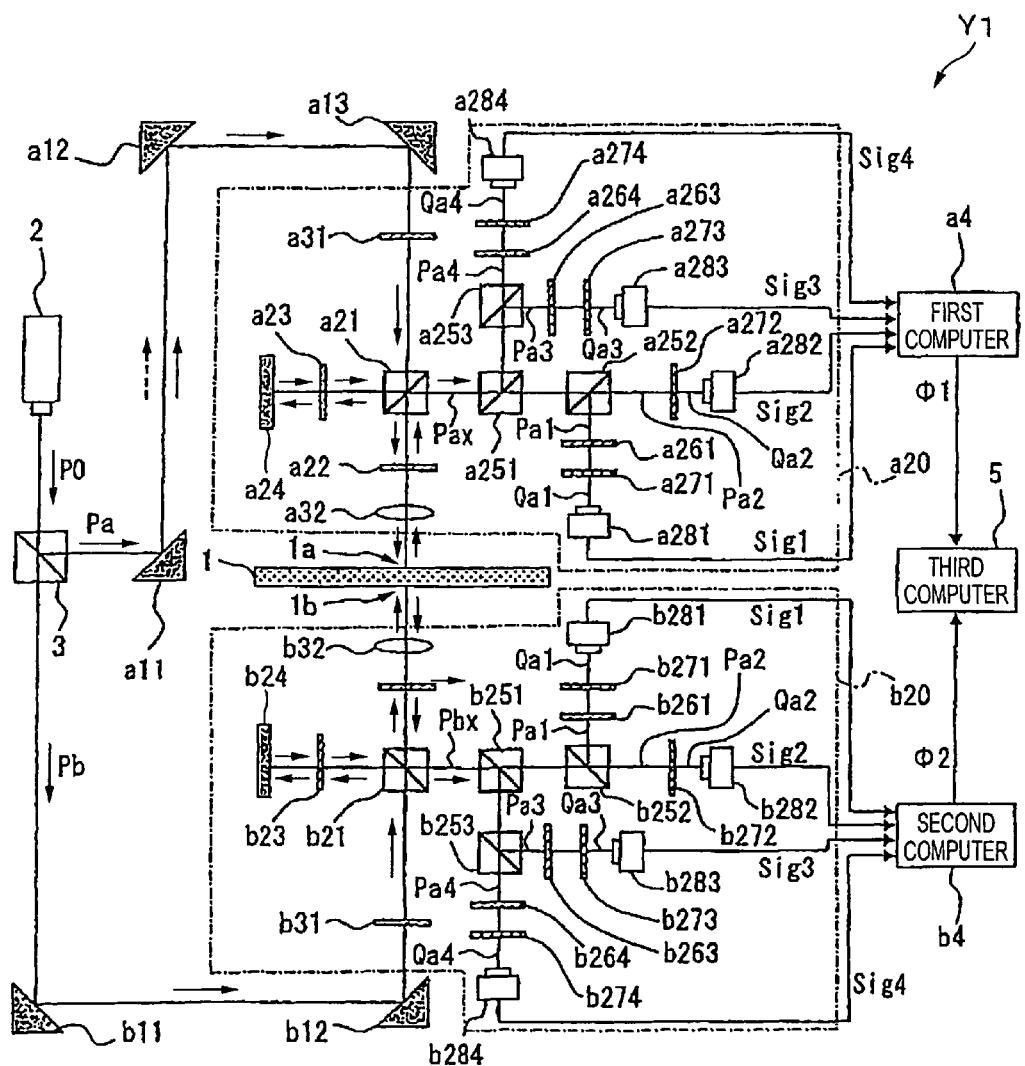
FIG. 2 is a configuration diagram of an interference light measuring section Y1 provided in a shape determining device X1.

As shown in FIG. 2, the interference light measuring section Y1 has: a laser light source 2; a polarizing beam splitter 3; a plurality of mirrors a11 to a13, b11 and b12; the light interferometer a20 on the A surface side and the light interferometer b20 on the B surface side; the first computer a4 and the second computer b4; and the third computer 5.

The laser light source 2 emits a light beam P0. The light beam P0 is a single wavelength light beam, whose frequency is not limited to a particular one. For example, when a light beam P0 of visible light is adopted, the frequency ω of the light beam P0 may be approximately $5 \times 10^8$ MHz.

The polarizing beam splitter 3 branches into two the light beam P0 emitted from the laser light source 2. Then, one light beam Pa of the two branched by the polarizing beam splitter 3 is guided to the direction of the A-surface measurement point 1a of the to-be-measured object 1 by the three mirrors a11, a12, and a13. Further, the other light beam Pb of the two branched by the polarizing beam splitter 3 is guided to the direction of the B-surface measurement point 1b of the to-be-measured object 1 by the two mirrors b11 and b12.

Here, the optical devices for guiding the light beams Pa and Pb respectively to the A-surface measurement point 1a and the B-surface measurement point 1b may be optical fibers or the like in place of the mirrors.

The light beam Pa guided to the A surface side of the to-be-measured object 1 is inputted to the light interferometer a20 on the A surface side. Similarly, the light beam Pb guided to the B surface side of the to-be-measured object 1 is inputted to the light interferometer b20 on the B surface side.

The two light interferometers a20 and b20 are homodyne interferometers and detect the intensity of the interference light beam between the reference light beam and the object light beam obtained by reflection of the light beams Pa and Pb respectively by the reference surface serving as a reference and by the measurement points 1a and 1b in a front and back relation with each other in the to-be-measured object 1.

As shown in FIG. 2, the light interferometer a20 on the A surface side and the light interferometer b20 on the B surface side have completely the same configuration with each other apart from the point that a different surface in the to-be-measured object 1 is adopted as the target of measurement. The following description is given for the configuration of the light interferometer a20 on the A surface side. Then, description is omitted for the configuration of the light interferometer b20 having the same configuration on the B surface side. Here, in FIG. 2, each component of the light interferometer a20 on the A surface side is designated by symbol "a . . . ", and each component of the light interferometer b20 on the B surface side is designated by symbol "b . . . ". Then, in the two light interferometers a20 and b20, components having the same symbol in the part obtained by excluding "a" or "b" from each symbol are identical.

As shown in FIG. 2, the light interferometer a20 has a ½-wavelength plate a31, a polarizing beam splitter a21, two ¼-wavelength plates a22 and a23, a reference plate a24, a condenser lens a32, three unpolarized beam splitters a251, a252, and a253, two ¼-wavelength plates a261 and a263, a ½-wavelength plate a264, four polarizing plates a271, a272, a273, and a274, and four photodetectors a281, a282, a283, and a284.

In some cases, the to-be-measured object 1 such as a semiconductor wafer having a thin plate shape vibrates, for example, at a frequency of approximately 50 Hz. In order that the detection result of the intensity of the interference light beam should not be affected by the vibrations of the to-be-measured object 1, the sampling frequency for the intensity of the interference light beam need be a frequency at a level capable of following the displacement speed of the surface of the to-be-measured object 1. In contrast to a two-dimensional image pick-up camera having an image pick-up cycle of 20 Hz to 100 Hz or the like, the photodetectors a281, a282, a283, and a284 can detect the intensity of the light beam at a high sampling frequency of 1 MHz or higher. Thus, the intensity of the interference light beam is achieved without being affected by the vibrations of the to-be-measured object 1.

The ½-wavelength plate a31 is an optical element for adjusting the plane of polarization of the light beam Pa guided to the A surface side of the to-be-measured object 1 by the mirrors a11 to a13.

The polarizing beam splitter a21 branches the light beam Pa whose plane of polarization has been adjusted by the ½-wavelength plate a31 into two light beams having mutually orthogonal polarization directions. Then, one of the branched light beams is projected onto a reference surface serving as a reference, and the other one of the branched light beams is projected onto the A-surface-side measurement point 1a. Here, the reference surface is the surface of the reference plate a24 held at a predetermined position.

The reference light beam which is the reflected light beam of the light beam incident on the reference surface returns to the polarizing beam splitter a21 in a state that its optical axis agrees with that of the incident light beam.

A ¼-wavelength plate a23 is arranged in the optical path of the light beam between the polarizing beam splitter a21 and the reference surface. The reference light beam whose polarization direction has been rotated by 90° relative to that of the original light beam at the time of the two-way passage through the ¼-wavelength plate a23 passes through the polarizing beam splitter a21.

On the other hand, the object light beam which is the reflected light beam of the light beam incident on the A-surface-side measurement point 1a returns to the polarizing beam splitter a21 in a state that its optical axis agrees with that of the incident light beam.

A ¼-wavelength plate a22 is arranged in the optical path of the light beam between the polarizing beam splitter a21 and the A-surface-side measurement point 1a. The object light beam whose polarization direction has been rotated by 90° relative to that of the original light beam at the time of the two-way passage through the ¼-wavelength plate a22 is reflected by the polarizing beam splitter a21 toward a direction agreeing with the optical axis of the reference light beam. Thus, a non-interference light beam Pax is acquired that contains the reference light beam and the object light beam as mutually orthogonal polarization components.

As described above, the polarizing beam splitter a21 and the two ¼-wavelength plates a22 and a23 branches the light beam Pa into two and then projects each onto the reference surface and the A-surface-side measurement point 1a, so that a non-interference light beam Pax is acquired that contains the reference light beam and the object light beam as mutually orthogonal polarization components. These are referred to as an optical system for non-interference light beam acquisition, hereinafter.

Further, between the ¼-wavelength plate a22 and the A-surface-side measurement point 1a, the condenser lens a32 is arranged that has a focal point at the A-surface-side measurement point 1a. That is, the condenser lens a32 is arranged in the optical path of the light beam and the object light beam between the optical system for non-interference light beam acquisition and the A-surface-side measurement point 1a.

Thus, even when a slight difference is present in the surface angle at each measurement point 1a, the operation of the condenser lens a32 suppresses deviation of the optical axis of the object light beam. As a result, reduction in the received light intensity of the object light beam and degradation in the interference efficiency can be suppressed that could be caused when the optical axis of the object light beam deviates depending on the difference in the surface angle at each A-surface-side measurement point 1a. Further, this reduces the spot of projection of the light beam onto the A-surface-side measurement point 1a. Further, when the light beam densely scans the surface of the to-be-measured object 1, the spatial resolution can be further improved in the measurement of thickness distribution in the two-dimensional directions over the surface of the to-be-measured object 1.

Further, the three unpolarized beam splitters a251, a252, and a253 branch the non-interference light beam Pax acquired by the optical system for non-interference light beam acquisition, into four branched light beams Pa1, Pa2, Pa3, and Pa4 by two steps of into-two branching. The three unpolarized beam splitters a251, a252, and a253 are referred to as an optical system for non-interference light beam branching, hereinafter.

That is, the beam splitter a251 performs the first step of into-two branching onto the non-interference light beam Pax. Further, the remaining beam splitters a252 and a253 perform the second step of into-two branching respectively onto the branched light beams from the non-interference light beam Pax.

Further, each of the two ¼-wavelength plates a261 and a263 and the one ½-wavelength plate a264 is a birefringent element for imparting a change in the phase difference between the orthogonal polarization components to each of the three branched light beams Pa1, Pa3, and Pa4 among the four branched light beams Pa1 to Pa4 generated on the basis of the non-interference light beam Pax. Here, the ¼-wavelength plate a261 imparts a shift of −¼ wavelength to the phase difference between the orthogonal polarization components in the branched light beam Pa1. Further, the ¼-wavelength plate a263 imparts a shift of +¼ wavelength to the phase difference between the orthogonal polarization components in the branched light beam Pa3. Further, the ½-wavelength plate a264 imparts a shift of +½ wavelength to the phase difference between the orthogonal polarization components in the branched light beam Pa4. Here, no phase shift is imparted to the branched light beam Pa2.

That is, each of the three wavelength plates a261, a263, and a264 imparts a change of −¼ wavelength, +¼ wavelength, or +½ wavelength with reference to the second branched light beam Pa2 among the four branched light beams Pa1 to Pa4 to the phase difference between the polarization component of the reference light beam and the polarization component of the object light beam in the remaining three branched light beams Pa1, Pa3, and Pa4.

As such, each of the three wavelength plates a261, a263, and a264 imparts a diverse change to the phase difference between the component of the reference light beam and the component of the object light beam, so as to cause a diverse phase difference between the polarization component of the reference light beam and the polarization component of the object light beam in each of the four branched light beams Pa1 to Pa4. The three wavelength plates a261, a263, and a264 are referred to as an optical system for phase shift, hereinafter.

Further, the four polarizing plates a271 to a274 extracts a polarization component having a common angle with reference to the polarization directions of the reference light beam and the object light beam in the branched light beam, from each of the four branched light beams Pa1 to Pa4 having passed through the optical system for phase shift a261, a263 and a264, and thereby extracts interference light beams Qa1 to Qa4 between each reference light beam and each object light beam. The four polarizing plates a271 to a274 are referred to as an optical system for interference light beam extraction, hereinafter. Here, the angle of the extracted polarization component is any one of +45° and −45° with reference to the polarization directions of the reference light beam and the object light beam.

Here, the angle of the polarization component allowed to pass through each of the four polarizing plates a271 to a274 is not simply set to be identical, and the angle measured with reference to the polarization directions of the reference light beam and the object light beam is unified to any one of +45° and −45°. Thus, the angle of the polarization component allowed to pass through each of the polarizing plates a271 to a274 becomes an angle deviated by 90°, for example, depending on which of the branched light beams Pa1 to Pa4 before and after the reflection by the mirror is adopted as a target of passage.

Further, the four photodetectors a281 to a284 detect the intensities of the four interference light beams Qa1 to Qa4 extracted by the optical system for interference light beam extraction, and then output the detection signals Sig1 to Sig4 to the first computer a4.

Here, on the B surface side, those corresponding to the non-interference light beam Pax, the branched light beams Pa1 to Pa4, and the interference light beams Qa1 to Qa4 are the non-interference light beam Pbx, the branched light beams Pb1 to Pb4, and the interference light beams Qb1 to Qb4, respectively.

Then, the first computer a4 applies into the following equation (F1) the detected intensities I1, I2, I3, and I4 of the interference light beams Qa1 to Qa4 acquired for the A surface of the to-be-measured object 1, so as to calculate the phase difference $\Phi$ between the polarization components of the reference light beam and the object light beam in the non-interference light beam Pax.

$$\Phi = \tan^{-1}[(I2-I4)/(I3-I1)] \quad (F1)$$

Here, as for the detected intensities I1, I2, I3, and I4 of the interference light beams Qa1 to Qa4, values are employed that have been adjusted in advance such that an offset and an amplitude of intensity of each of change are identical when a fluctuation is imparted to the phase difference $\Phi$ between the polarization components of the reference light beam and the object light beam.

Here, the second computer b4 also performs processing similar to that of the first computer a4 on the basis of the detected intensities of the interference light beams Qb1 to Qb4 acquired for the B surface of the to-be-measured object 1.

Then, the third computer 5 performs phase connection processing on the basis of the distribution of the difference ($\Phi a - \Phi b$) between the phase difference $\Phi a$ on the A surface side and the phase difference $\Phi b$ on the B surface side calculated for the plurality of A-surface-side measurement points 1a and B-surface-side measurement points 1b, so as to calculate the thickness distribution of the to-be-measured object 1.

Here, the phase difference $\Phi$ obtained by applying into equations (B1) the detected intensities (I1, I2, I3, and I4) of the interference light beams Qa1 to Qa4 on the A surface side is the phase difference $\Phi a$ on the A surface side. Further, the phase difference $\Phi$ similarly obtained from the detected intensities of the interference light beams Qb1 to Qb4 on the B surface side is the phase difference $\Phi b$ on the B surface side.

The reasoning of derivation of equation (F1) is described below.

When it is assumed that the offsets D1 to D4 and the amplitudes H1 to H4 of the detected intensities I1, I2, I3, and I4 are equal to each other and respectively equal to D and H, the detected intensities I1, I2, I3, and I4 are expressed by the following equations (F2).

$$I1 = D + H \times \sin(\Phi - \pi/2)$$

$$I2 = D + H \times \sin(\Phi)$$

$$I3 = D + H \times \sin(\Phi + \pi/2)$$

$$I4 = D + H \times \sin(\Phi + \pi) \quad (F2)$$

By rewriting these equations (F2), equation (F1) is derived.

Meanwhile, in some cases, the offsets and the amplitudes of the actually detected intensities of the interference light beams Qa1 to Qa4 obtained by the four photodetectors a281 to a284 when fluctuation is imparted to the phase difference $\Phi$ between the polarization components of the reference light beam and the object light beam do not agree with each other owing to the individual specificity in the characteristics of the optical system or the photodetectors a281 to a284.

That is, the actually detected intensities I1', I2', I3', and I4' of the interference light beams Qa1 to Qa4 obtained by the photodetectors a281 to a284 are expressed by the following equations (F3).

$$I1' = D1 + H1 \times \sin(\Phi - \pi/2)$$

$$I2' = D2 + H2 \times \sin(\Phi)$$

$$I3' = D3 + H3 \times \sin(\Phi + \pi/2)$$

$$I4' = D4 + H4 \times \sin(\Phi + \pi) \quad (F3)$$

Here, the offsets D1 to D4 and the amplitudes H1 to H4 are constants determined by the individual specificity of the characteristics of the optical system or the photodetectors a281 to a284. Then, when equations (F3) are rewritten, the following equations (F4) are derived.

$$I1'/H1-D1/H1=\sin(\Phi-\pi/2)$$

$$I2'/H2-D2/H2=\sin(\Phi)$$

$$I3'/H3-D3/H3=\sin(\Phi+\pi/2)$$

$$I4'/H4-D4/H4=\sin(\Phi+\pi) \quad (F4)$$

Thus, when the constants D1 to D4 and H1 to H4 in the equations (F3) are specified in advance by imparting a fluctuation to the phase difference Φ between the polarization components of the reference light beam and the object light beam, such intensities I1 to I4 in which the offsets D1 to D4 (=0) and the amplitudes H1 to H4 (=1) agree with each other can be derived from the actually detected intensities I1', I2', I3', and I4' on the basis of the following equations (F5).

$$I1=I1'/H1-D1/H1$$

$$I2=I2'/H2-D2/H2$$

$$I3=I3'/H3-D3/H3$$

$$I4=I4'/H4-D4/H4 \quad (F5)$$

In addition, in a case that the photodetectors a281 to a284 have an offset and gain adjustment function, adjustment may be performed in advance by using the adjustment function such that the offsets and the amplitudes of the actually detected intensities I1', I2', I3', and I4' agree with each other.

Further, the method of imparting a fluctuation to the phase difference Φ between the polarization components of the reference light beam and the object light beam may be, for example, to impart vibrations to the to-be-measured object 1 or the reference plate a24 such that a displacement greater than or equal to ½ of the wavelength of the light beam is generated.

In the shape determining device X1 described above, the two light interferometers a20 and b20 which are homodyne interferometers can be realized by a remarkably simple configuration especially for the light source, the signal processing section, and the like in comparison with the case of heterodyne interferometers.

Further, even when the to-be-measured object 1 vibrates at high speeds, the plurality of photodetectors a281, a282, a283, and a284 can operate at high speeds sufficiently higher than the displacement speed of the surface of the to-be-measured object 1. Thus, the shape determining device X1 according to the present invention is preferable also for thickness measurement for the to-be-measured object 1 such as a semiconductor wafer that has a thin plate shape whose edge portion is supported and that vibrates at high speeds. Further, in the two light interferometers a20 and b20, when a light beam having a small spot diameter densely scans the surface of the to-be-measured object 1, the spatial resolution can be improved in the measurement of thickness distribution in the two-dimensional directions over the surface of the to-be-measured object 1.

Further, in the two light interferometers a20 and b20, phase shift onto the orthogonal polarization components of the reference light beam and the object light beam is performed optically by the wavelength plates a261, a263, a264, b261, b263, and b264. Thus, for each of the measurement points 1a and 1b, a plurality of interference light beams Qa1 to Qa4 and Qb1 to Qb4 having undergone phase shift can simultaneously be acquired from one of the non-interference light beams Pax and Pbx beam serving as an origin. Then, the phase differences Φa and Φb between each reference light beam and each object light beam can be calculated from the plurality of interference light beams Qa1 to Qa4 and Qb1 to Qb4. Then, the thickness distribution of the to-be-measured object 1 can be calculated from the distribution of the difference (Φa−Φb) between the phase differences Φa and Φb on the A surface side and the B surface.

Further, the phase differences Φa and Φb are calculated from relative evaluation of the intensities of the plurality of interference light beams Qa1 to Qa4 and Qb1 to Qb4 obtained from the non-interference light beams Pax and Pbx serving as origins, and hence are hardly affected by external disturbance factors like fluctuations in the characteristics of the laser light source 2 and differences in the surface angle and the light reflectivity at the plurality of measurement points 1a and 1b.

Further, external disturbances like differences in the surface angle at the plurality of measurement points 1a and 1b and slight changes in the holding angles for the optical devices such as the mirrors and the beam splitters cause a change in the angle, the superposition condition, or the like of the optical axes of the reference light beam and the object light beam. Then, this change results in a change in the phase difference between the reference light beam and the object light beam in the plurality of interference light beams Qa1 to Qa4 and Qb1 to Qb4.

In such a situation, in the light interferometers a20 and b20, the interference light beams Qa1 to Qa4 and Qb1 to Qb4 used in the calculation of the phase differences Φa and Φb are acquired by extracting common polarization components from the branched light beams Pa1 to Pa4 and Pb1 to Pb4 of the non-interference light beams Pax and Pbx. Thus, the change in the phase differences Φa and Φb between the reference light beam and the object light beam caused by the external disturbances is reflected in the same direction in the plurality of interference light beams Qa1 to Qa4 and Qb1 to Qb4. Then, when the phase difference is calculated by relative evaluation of the intensities of the plurality of interference light beams Qa1 to Qa4 and Qb1 to Qb4, each change in the phase differences Φa and Φb between the reference light beam and the object light beam caused by the external disturbances is canceled out in the stage of calculation of the phase difference. Thus, the error in the measurement can be reduced.

Further, it is preferable that in each of the two light interferometers a20 and b20, the optical path lengths of the branched light beams Pa1 to Pa4 and Pb1 to Pb4 obtained by branching the non-interference light beams Pax and Pbx are set equal to each other.

Then, the influence of external disturbances in the optical path of each of the branched light beams Pa1 to Pa4 and Pb1 to Pb4 is reflected to the same extent to each of the plurality of interference light beams Qa1 to Qa4 and Qb1 to Qb4. Accordingly, in the stage of calculation of the phase difference by relative evaluation of the intensities of the plurality of interference light beams Qa1 to Qa4 and Qb1 to Qb4, the cancellation of the changes in the phase difference between the reference light beam and the object light beam caused by the external disturbances becomes more effective, and hence the error in the calculation of the phase differences Φa and Φb can be reduced further.

In the embodiment described above, as shown in FIG. 3, description has been given for a case that the position of the measurement points 1a and 1b sequentially varies along the spiral locus R on the surface of the to-be-measured object 1.

Figure 4:
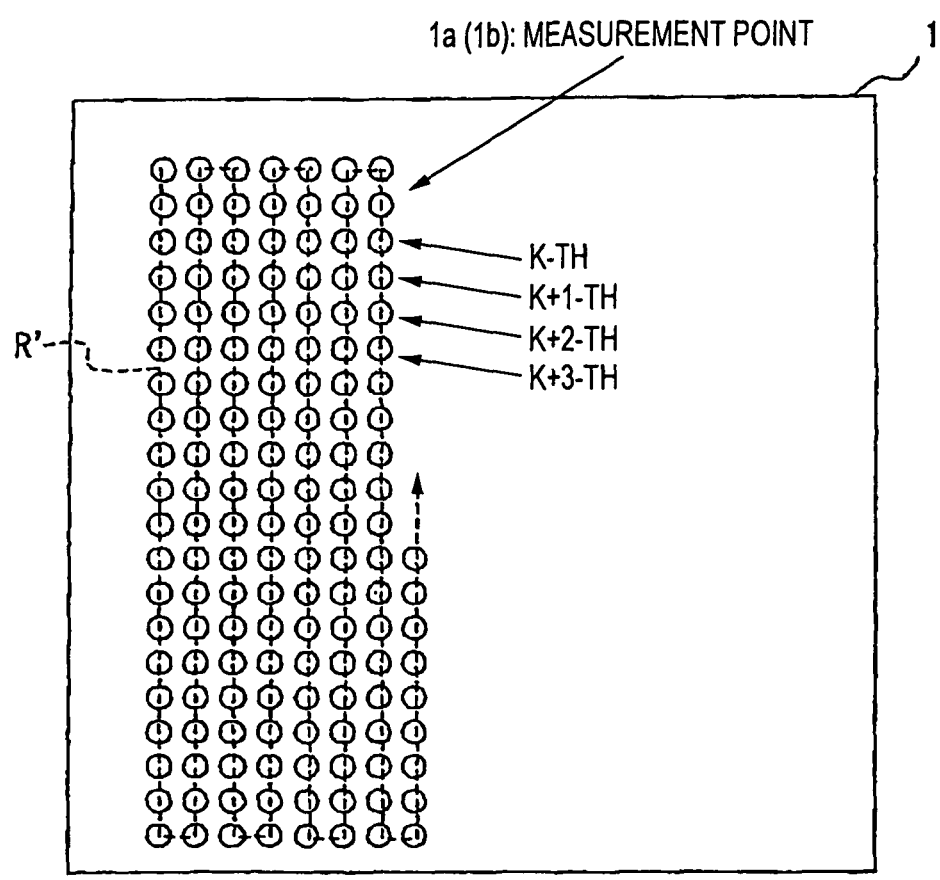
FIG. 4 is a schematic diagram showing another example of distribution of measurement points in a to-be-measured object.

However, for example, a device for causing the support section 44 for supporting the to-be-measured object 1 to move along each of two mutually intersecting straight lines like in the case of an X-Y plotter may be adopted as the movable support device Z1. In this case, the position of the measurement points 1a and 1b may sequentially vary along a locus R' shown in FIG. 4 on the surface of the to-be-measured object 1.

Further, the processing performed by the three computers a4, b4, and 5 may be realized by one or two computers.

Further, the embodiment described above has been given for an example that each of the non-interference light beams Pax and Pbx is branched into the four branched light beams Pa1 to Pa4 or Pb1 to Pb4. However, as long as each of the non-interference light beams Pax and Pbx is branched into three or more branched light beams, the phase differences Φa and Φb can be calculated similarly.

For example, in a case that the non-interference light beam Pax is branched into four similarly to the embodiment described above, when the detected intensities I1, I2, and I3 of the three interference light beams acquired from three of the four branched light beams are applied into the following equation (B6), the phase difference Φ can be calculated. Here, similarly to the embodiment described above, the optical system for phase shift imparts a phase difference change of −¼ wavelength to the first branched light beam Pa1 with reference to the second branched light beam Pa2. Further, the optical system for phase shift imparts a phase difference change of +¼ wavelength to the third branched light beam Pa3 with reference to the second branched light beam Pa2.

$$\Phi = \tan^{-1}[(2 \times I2 - I3 - I1)/(I3 - I1)] \quad (B6)$$

Here, as for the detected intensities I1, I2, and I3 of the interference light beams Qa1 to Qa3, values are employed that have been adjusted in advance such that an offset and an amplitude of intensity of each of change are identical when a fluctuation is imparted to the phase difference Φ between the polarization components of the reference light beam and the object light beam.

As such, even when shape measuring is performed on the basis of the detected intensities I1, I2, and I3 of the three interference light beams Qa1 to Qa3, an operation effect similar to that of the embodiment described above is achieved.

Second Invention

An embodiment of a second invention is described below with reference to the accompanying drawings for the purpose of providing the understanding of the present invention. Here, the embodiment given below is an example of implementation of the present invention and does not restrict the technical scope of the present invention.

A shape determining device X2 according to an embodiment of the second invention is described below with reference to a configuration diagram shown in FIG. 5.

The shape determining device X2 is a device for measuring the height of the front and the back surfaces of a to-be-measured object 1 such as a semiconductor wafer provided with a thin plate shape and then calculating the difference so as to measure the thickness distribution of the to-be-measured object 1.

Figure 5:
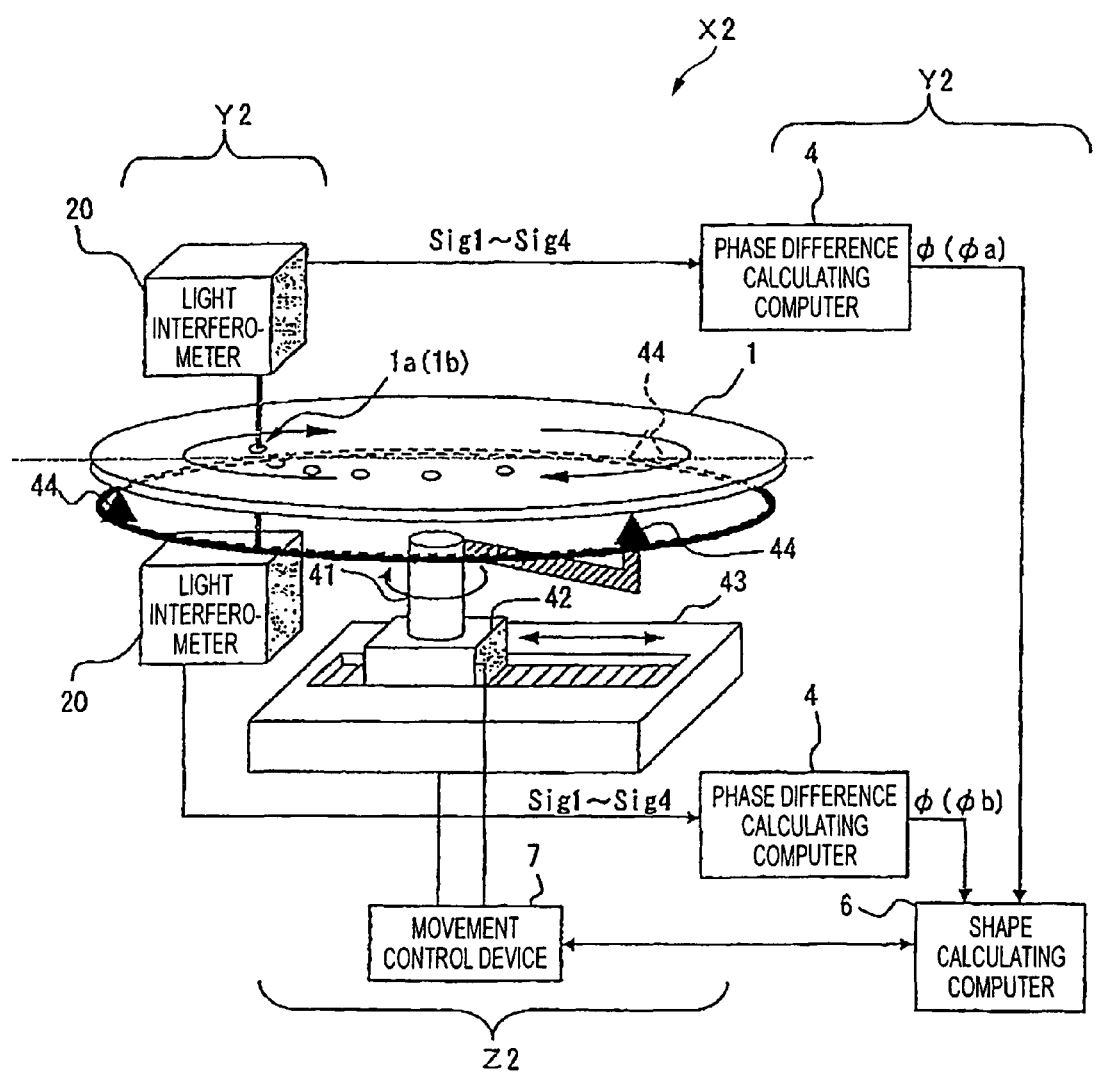
FIG. 5 is a schematic configuration diagram of a shape determining device X2 according to an embodiment of a second invention.

As shown in FIG. 5, the shape determining device X2 has: an interference light measuring section Y2 including two light interferometers 20 composed of homodyne interferometers; and a movable support device Z2. Further, the interference light measuring section Y2 has two phase difference calculating computers 4 and one shape calculating computer 6 in addition to the two light interferometers 20.

In the shape determining device X2, a to-be-measured object 1 is supported by the movable support device Z2.

In the following description, for convenience, one surface (the upper surface in FIGS. 5 and 6) of the to-be-measured object 1 is referred to as A surface, and the other surface in the relation of front and back relative to the A surface is referred to as B surface. Further, a thickness measurement site on the A surface of the to-be-measured object 1 is referred to as an A-surface measurement point 1a, and a thickness measurement site on the B surface in a front and back relation corresponding to the A-surface measurement point 1a is referred to as a B-surface measurement point 1b.

One of the light interferometers 20 is arranged on the A surface side of the to-be-measured object 1, and the other one of the light interferometers 20 is arranged on the B surface side of the to-be-measured object 1.

Each of the two phase difference calculating computers 4 and the shape calculating computer 6 has a CPU, a memory, signal input/output interfaces, and the like. The CPU executes a predetermined program so as to execute: various kinds of calculation; transmission and reception of signals to and from an external device through the signal input/output interfaces; recording of data into the memory; and the like.

The two light interferometers 20 are homodyne interferometers for projecting light beams onto a reference surface serving as a reference and onto the measurement points 1a and 1b on the front and the back surfaces of the to-be-measured object 1 and then outputting intensity signals Sg1 to Sg4 of interference light beams obtained by superposition of the reference light beam and the object light beam which are reflected light beams.

Further, the two phase difference calculating computers 4 executes the processing of calculating the phase differences φ between the reference light beam and the object light beam on the basis of the intensity signals Sg1 to Sg4 of the interference light beams outputted from the two light interferometers 20. Details of this are described later. In the following description, for convenience, when the phase differences φ calculated for the A surface side and the B surface side need be distinguished, they are referred to as a phase difference φa and a phase difference φb, respectively.

Further, the shape calculating computer 6 executes the processing of calculating the thickness distribution of the to-be-measured object 1 on the basis of the distribution of the difference (φa−φb) between the phase differences φa and φb calculated for the A-surface-side measurement point 1a and the B-surface-side measurement point 1b at plural sites.

Details of the individual components provided in the shape determining device X2 are described below.

The movable support device Z2 is a device for supporting the to-be-measured object 1 between the emitting sections for the object light beams from the two light interferometers 20, and moving the supporting position in the two-dimensional directions. That is, the movable support device Z2 changes the relative position of the to-be-measured object 1 relative to the two light interferometers 20 in the two-dimensional directions. In the example shown in FIG. 5, the movable support device Z2 moves the to-be-measured object 1 in the horizontal directions.

As shown in FIG. 5, the movable support device Z2 has a revolving shaft 41, a support section 44 linked with this, a revolution drive section 42, a linear movement mechanism 43, and a movement control device 7.

The disk-shaped to-be-measured object 1 such as a semiconductor wafer is supported at three points in the edge part by the support sections 44 arranged at three positions on the circumference. These three support sections 44 are linked with the revolving shaft 41 extending toward the center of the circumference.

Further, the revolving shaft 41 is driven and revolved by the revolution drive section 42 such as a servo motor. By virtue of this, the to-be-measured object 1 revolves around the center part serving as the center of revolution.

Further, the linear movement mechanism 43 linearly moves the revolving shaft 41 and the revolution drive section 42 within a predetermined movement range in a direction parallel to the front and the back surfaces of the to-be-measured object 1, that is, in a direction orthogonal to the thickness direction of the to-be-measured object 1. That is, the linear movement mechanism 43 moves the disk-shaped to-be-measured object 1 along a radial direction.

Further, the movement control device 7 controls the movement of the revolution drive section 42 and the linear movement mechanism 43. Further, the movement control device 7 detects the position of projection of the object light beams onto the to-be-measured object 1, that is, the position of the measurement points 1a and 1b which varies frequently, and then transmits the detection result to the phase difference calculating computer 6. The detection of the position of the measurement points 1a and 1b is performed, for example, on the basis of the history of operating commands to the revolution drive section 42 and the linear movement mechanism 43, that is, on the basis of the movement history of the to-be-measured object 1. Alternatively, the position of the measurement points 1a and 1b may be detected on the basis of the detection results from position detection sensors (not shown) provided respectively in the revolution drive section 42 and the linear movement mechanism 43.

By the simultaneous use of the revolution of the to-be-measured object 1 performed by the revolution drive section 42 and the linear movement of the to-be-measured object 1 performed by the linear movement mechanism 43, the shape determining device X2 sequentially changes the position of the measurement points 1a and 1b in the to-be-measured object 1, that is, the position of the spot of projection of the object light beams. Then, the phase differences $\phi a$ and $\phi b$ are measured at the plurality of measurement points 1a and 1b.

For example, the movement control device 7 revolves and linearly moves the to-be-measured object 1 continuously at a constant speed, and transmits a data acquisition instruction to the shape calculating computer 6 in a constant period or alternatively at each time that the position of the measurement points 1a and 1b is located at a position defined in advance. Then, in response to receiving of the data acquisition instruction, the shape calculating computer 6 requests to the two phase difference calculating computers 4 the calculation of the phase differences $\phi a$ and $\phi b$, and then acquires the calculation results. Further, from the distribution of the difference between the phase differences $\phi a$ and $\phi b$ at the plurality of measurement points 1a and 1b, the shape calculating computer 6 calculates the thickness distribution of the to-be-measured object 1.

Figure 7:
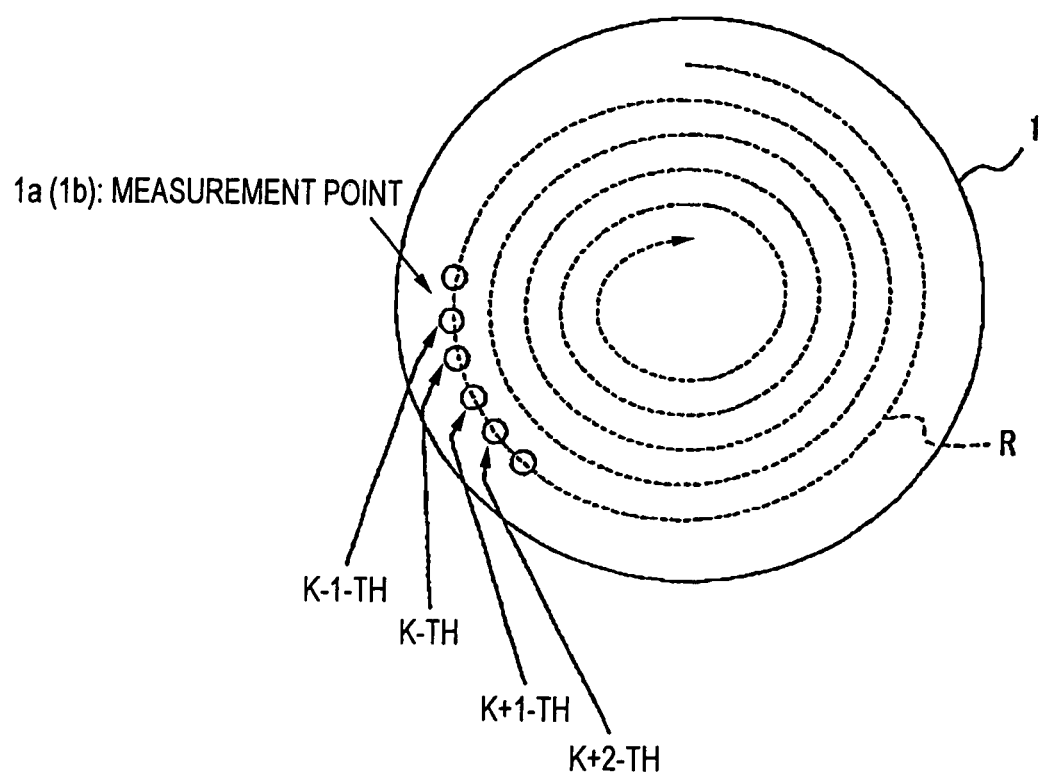
FIG. 7 is a schematic diagram showing an example of distribution of measurement points on the surface of a to-be-measured object in a shape determining device X2.

FIG. 7 is a schematic diagram showing an example of distribution of the plurality of measurement points 1a and 1b on the surface of the to-be-measured object 1 in the shape determining device X2.

When the measurement of the phase differences $\phi a$ and $\phi b$ is performed sequentially in a state that the to-be-measured object 1 is revolved and linearly moved, as indicated by a dashed line in FIG. 7, the position of the measurement points 1a and 1b varies sequentially along a spiral locus R on the surface of the to-be-measured object 1. The plurality of measurement points 1a and 1b and the phase differences $\phi a$ and $\phi b$ corresponding to these are identified, for example, by measurement point numbers (1, 2, 3 . . . ) assigned in the order of measurement. FIG. 7 shows the locus of the measurement points 1a and 1b having (K−1)-th to (K+2)-th measurement numbers.

As such, in the shape determining device X2, the object light beams from the two light interferometers 20 scan along one scanning line R on the to-be-measured object 1.

Next, the interference light measuring section Y2 including the two light interferometers 20 is described below with reference to the configuration diagram shown in FIG. 6.

Figure 6:
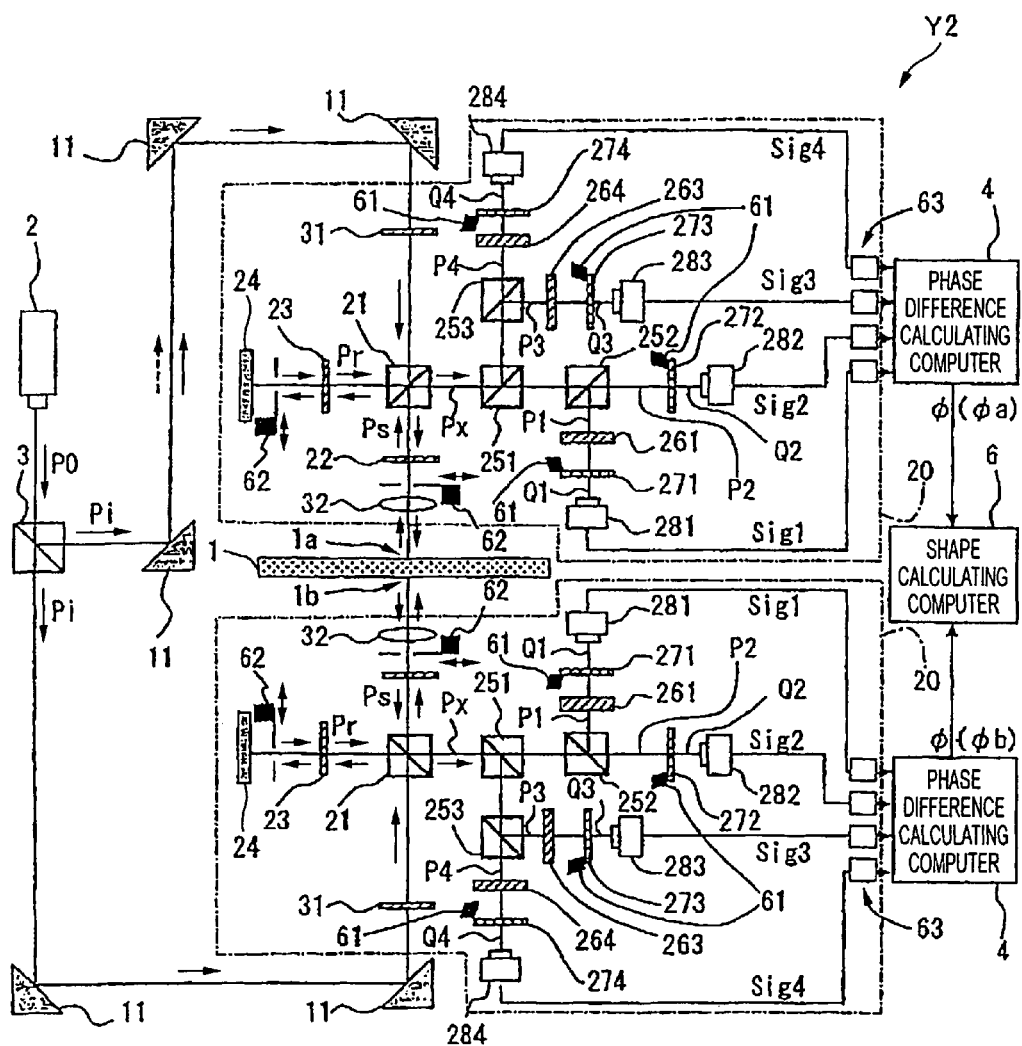
FIG. 6 is a configuration diagram of an interference light measuring section Y2 provided in a shape determining device X2.

As shown in FIG. 6, the interference light measuring section Y2 has: a laser light source 2; a polarizing beam splitter 3; a plurality of mirrors 11; the two light interferometers 20 provided on the A surface side and the B surface side, respectively; the two phase difference calculating computers 4; and the shape calculating computer 6.

The laser light source 2 emits a light beam P0. The light beam P0 is a single wavelength light beam, whose frequency is not limited to a particular one. For example, when a light beam P0 of visible light is adopted, the frequency $\omega$ of the light beam P0 may be approximately $5\times10^8$ MHz (wavelength $\lambda \approx 0.6$ μm).

The polarizing beam splitter 3 branches into two the light beam P0 emitted from the laser light source 2. Then, the branched light beams Pi are guided to the direction of the A-surface measurement point 1a and the direction of the B-surface measurement point 1b of the to-be-measured object 1 by the mirrors 11.

Here, the optical devices for guiding the light beams Pi respectively to the A-surface measurement point 1a and the B-surface measurement point 1b may be optical fibers or the like in place of the mirrors.

The light beams Pi guided to the A surface side and the B surface side of the to-be-measured object 1 are inputted respectively to the two light interferometers 20.

The two light interferometers 20 are homodyne interferometers, and detect the intensity of the interference light beam between the reference light beam Pr and the object light beam Ps obtained when the light beams Pi guided to the front and the back surfaces side of the to-be-measured object 1 are reflected at a reference surface serving as a reference and at the measurement points 1a and 1b which are in a front and back relation with each other in the to-be-measured object 1.

As shown in FIG. 6, the two light interferometers 20 have completely the same configuration apart from the point that a different surface in the to-be-measured object 1 is adopted as the target of measurement.

As shown in FIG. 6, each of the two light interferometers 20 has a ½-wavelength plate 31, a polarizing beam splitter 21, two ¼-wavelength plates 22 and 23, a reference plate 24, a condenser lens 32, three unpolarized beam splitters 251, 252, and 253, two ¼-wavelength plates 261 and 263, a ½-wavelength plate 264, four polarizing plates 271, 272, 273, and 274, four photodetectors 281, 282, 283, and 284, and four amplifiers 63.

Further, each of the two light interferometers 20 has four polarizing plate holding mechanisms 61, two light beam blocking mechanisms 62, and four amplifiers 63.

The ½-wavelength plate 31 is an optical element for adjusting the plane of polarization of the light beam Pi guided to the vicinity of the surface of the to-be-measured object 1 by the mirrors 11.

The polarizing beam splitter 21 branches the light beam Pi whose plane of polarization has been adjusted by the ½-wavelength plate 31 into two light beams having mutually orthogonal polarization directions. Then, one of the branched light beams is projected onto a reference surface serving as a reference, and the other one of the branched light beams is projected onto the measurement points 1a and 1b. Here, the reference surface is the surface of the reference plate 24 held at a predetermined position.

The reference light beam Pr which is the reflected light beam of the light beam incident on the reference surface returns to the polarizing beam splitter 21 in a state that its optical axis agrees with that of the incident light beam.

A ¼-wavelength plate 23 is arranged in the optical path of the light beam between the polarizing beam splitter 21 and the reference surface. The reference light beam Pr whose polarization direction has been rotated by 90° relative to that of the original light beam at the time of the two-way passage through the ¼-wavelength plate 23 passes through the polarizing beam splitter 21.

On the other hand, the object light beam Ps which is the reflected light beam of the light beam incident on the measurement points 1a and 1b returns to the polarizing beam splitter 21 in a state that its optical axis agrees with that of the incident light beam.

A ¼-wavelength plate 22 is arranged in the optical path of the light beam between the polarizing beam splitter 21 and the measurement points 1a and 1b. The object light beam Ps whose polarization direction has been rotated by 90° relative to that of the original light beam at the time of the two-way passage through the ¼-wavelength plate 22 is reflected by the polarizing beam splitter 21 toward a direction agreeing with the optical axis of the reference light beam Pr. Thus, a non-interference light beam Px is acquired that contains the reference light beam Pr and the object light beam Ps as mutually orthogonal polarization components.

As described above, the polarizing beam splitter 21 and the two ¼-wavelength plates 22 and 23 branches the light beam Pi into two and then projects each onto the reference surface and the measurement points 1a and 1b, so that a non-interference light beam Px is acquired that contains the reference light beam Pr and the object light beam Ps as mutually orthogonal polarization components. These are referred to as an optical system for non-interference light beam acquisition, hereinafter.

Further, between the ¼-wavelength plate 22 and the measurement points 1a and 1b, the condenser lens 32 is arranged that has a focal point at the measurement points 1a and 1b. That is, the condenser lens 32 is arranged in the optical path of the light beam and the object light beam Ps between the optical system for non-interference light beam acquisition and the measurement points 1a and 1b.

Thus, even when a slight difference is present in the surface angle at the individual measurement points 1a and 1b, the operation of the condenser lens 32 suppresses deviation of the optical axis of the object light beam Ps. As a result, reduction in the received light intensity of the object light beam Ps and degradation in the interference efficiency can be suppressed that could be caused when the optical axis of the object light beam Ps deviates depending on the difference in the surface angle at each measurement points 1a and 1b. Further, this reduces the spot of projection of the light beam onto the measurement points 1a and 1b. Further, when the light beam densely scans the surface of the to-be-measured object 1, the spatial resolution can be further improved in the measurement of thickness distribution in the two-dimensional directions over the surface of the to-be-measured object 1.

Further, the three unpolarized beam splitters 251, 252, and 253 branch the non-interference light beam Px acquired by the optical system for non-interference light beam acquisition, into four non-interference light beams P1, P2, P3, and P4 by two steps of into-two branching. The three unpolarized beam splitters 251, 252, and 253 are referred to as an optical system for non-interference light beam branching, hereinafter.

That is, the beam splitter 251 performs the first step of into-two branching onto the non-interference light beam Px. Further, the remaining beam splitters 252 and 253 perform the second step of into-two branching respectively onto the branched light beams from the non-interference light beam Px.

Further, each of the two ¼-wavelength plates 261 and 263 and the one ½-wavelength plate 264 is a birefringent element for imparting a change in the phase difference between the orthogonal polarization components to each of the three non-interference light beams P1, P3, and P4 among the four non-interference light beams P1 to P4. Here, the ¼-wavelength plate 261 imparts a shift of $-\pi/2$ $(=-90°)$ to the phase difference between the orthogonal polarization components in the non-interference light beam P1. Further, the ¼-wavelength plate 263 imparts a shift of $+\pi/2$ $(=+90°)$ to the phase difference between the orthogonal polarization components in the non-interference light beam P3. Further, the ½-wavelength plate 264 imparts a shift of $\pi(=+180°)$ to the phase difference between the orthogonal polarization components in the branched light beam P4. Here, no phase shift is imparted to the branched light beam P2.

That is, the three wavelength plates 261, 263, and 264 impart a change of $-\pi/2$ $(=-90°)$, $+\pi/2$ $(=+90°)$, and $\pi(=+180°)$ with reference to the second non-interference light beam P2 among the four non-interference light beams P1 to P4, to each of the phase differences between the polarization components of the reference light beam Pr and the polarization component of the object light beam Ps in the three remaining non-interference light beams P1, P3, and P4.

As such, each of the three wavelength plates 261, 263, and 264 imparts a diverse change to the phase difference between the component of the reference light beam Pr and the component of the object light beam Ps, so as to cause a diverse phase difference between the polarization component of the reference light beam Pr and the polarization component of the object light beam Ps in each of the four non-interference light beams P1 to P4. The three wavelength plates 261, 263, and 264 are referred to as an optical system for phase shift, hereinafter.

Further, the four polarizing plates 271 to 274 extracts a polarization component having a common angle with reference to the polarization directions of the reference light beam Pr and the object light beam Ps, from each of the four non-interference light beams P1 to P4 having passed through the optical system for phase shift 261, 263 and 264, and thereby extracts the interference light beams Q1 to Q4 between each reference light beam Pr and each object light beam Ps. The four polarizing plates 271 to 274 are referred to as an optical system for interference light beam extraction, hereinafter. Here, the angle of the extracted polarization component is any one of +45° and −45° with reference to the polarization directions of the reference light beam Pr and the object light beam Ps.

Here, it is preferable that as for the angle of the polarization component allowed to pass through each of the four polarizing plates 271 to 274, the angle measured with reference to the polarization directions of the reference light beam Pr and the object light beam Ps is unified to any one of +45° and −45°.

The four photodetectors 281 to 284 are an example of the light intensity detecting unit for detecting the intensities of the four interference light beams Q1 to Q4 extracted by the optical system for interference light beam extraction and then outputting detection signals Sig1 to Sig4.

Further, the four amplifiers 63 independently amplify the individual detection signals of the four photodetectors 281 to 284 and then output the amplified detection signals to the phase difference calculating computer 4. That is, the amplifiers 63 perform linear correction on the intensity signals of the four light beams acquired by the photodetectors 281 to 284 in accordance with the amplification gains set up individually, and are an example of the light intensity correcting unit. Here, the amplification gains are gains of linear correction.

Further, as described later, in some cases, the phase difference calculating computer 4 performs offset correction on the intensity signals Sig1 to Sig4 of the four light beams outputted from the amplifiers 63, by adding offset correction values set up individually for the intensity signals Sig1 to Sig4 of the four light beams. In this case, the four amplifiers 63 and the phase difference calculating computer 4 are an example of the light intensity correcting unit for performing linear correction and offset correction independently on the four light intensities acquired by the photodetectors 281 to 284.

Further, the four polarizing plate holding mechanisms 61 respectively hold the four polarizing plates 271 to 274 in such a manner that each holding angle is variable. More specifically, the polarizing plate holding mechanisms 61 hold the polarizing plates 271 to 274 in an orientation orthogonal to the optical axis of the non-interference light beams P1 to P4 and hold the polarizing plates 271 to 274 in a manner permitting rotation about the optical axis.

The polarizing plate holding mechanism 61 may be provided with a manually-operated holding angle adjusting mechanism, or alternatively an automatic holding angle adjusting mechanism that changes the holding angle of each of the polarizing plates 271 to 274 in response to a control command from a predetermined controller.

For example, the manually-operated holding angle adjusting mechanism may be such that the holding angle of each of the polarizing plates 271 to 274 is changed in response to adjusting operation from an operator by using screws or the like. Further, the automatic holding angle adjusting mechanism may be provided with a driving source such as a piezo-electric element for changing the holding angle of each of the polarizing plates 271 to 274 in response to a control command from a predetermined controller. Further, its controller may be implemented by the phase calculating computer 4 or the shape calculating computer 6.

Further, the two light beam blocking mechanisms 62 are an example of the light beam blocking unit for blocking individually the object light beam Ps and the reference light beam Pr. The light beam blocking mechanism 62 has, for example: a light beam blocking member for blocking a light beam; and a moving mechanism for moving the light beam blocking member between a position on the optical path of the object light beam Ps or the reference light beam Pr and a position of retreat from the optical path. Further, the moving mechanism may be a manually-operated moving mechanism that operates in accordance with operation by an operator, or alternatively an automatic moving mechanism that operates automatically in response to a control command from a predetermined controller. Further, its controller may be implemented by the phase calculating computer 4 or the shape calculating computer 6.

In the following description, the path of each of the four light beams and signals that extends from the optical paths of the non-interference light beams P1 to P4 obtained by branching the non-interference light beam Px into four by the optical system for non-interference light beam branching 251 to 253 to the output line of the photodetectors 281 to 284 is referred to as a channel. Further, among the four channels, the channel of the second interference light beam Q2 serving as a target of calculation of the phase difference $\phi$ between the object light beam Ps and the reference light beam Pr is referred to as a reference channel. The other three channels are referred to as non-reference channels.

In the light interferometers 20, when errors in the amounts of phase shift of the ¼-wavelength plates 261 and 263 and the ½-wavelength plate 264 are not taken into consideration, the following equations (B1) hold which are simultaneous equations containing four relational expressions of the intensities as1 to as4 of the object light beam Ps in the individual channels, the intensities ar1 to ar4 of the reference light beam Pr in the individual channels, the intensities I01 to I04 of the interference light beams Q1 to Q4 in the individual channels, and the phase difference $\phi$ of the object light beam Ps and the reference light beam Pr. Here, I01 to I04 correspond to the detection values obtained by the photodetectors 281 to 284 before being amplified by the amplifiers 63.

[Mathematical Expression 3]

$$I01 = (as1 + ar1) + 2 \cdot \sqrt{as1} \cdot \sqrt{ar1} \cdot \sin(\phi - \pi/2)$$

$$I02 = (as2 + ar2) + 2 \cdot \sqrt{as2} \cdot \sqrt{ar2} \cdot \sin(\phi)$$

$$I03 = (as3 + ar3) + 2 \cdot \sqrt{as3} \cdot \sqrt{ar3} \cdot \sin(\phi + \pi/2)$$

$$I04 = (as4 + ar4) + 2 \cdot \sqrt{as4} \cdot \sqrt{ar4} \cdot \sin(\phi + \pi) \quad \text{(B1)}$$

When the intensities as1 to as4 of the object light beam Ps in the individual channels and the intensities ar1 to ar4 of the reference light beam Pr in the individual channels are equal to each other, equations (B1) given above is rewritten into the following equation (B2).

[Mathematical Expression 4]

$$\phi = \tan^{-1}\left(\frac{\sin\phi}{\cos\phi}\right) = \tan^{-1}\left(\frac{I02 - I04}{I03 - I01}\right) \quad \text{(B2)}$$

When equation (B2) is satisfied actually, the phase difference $\phi$ can be calculated with precision from the intensities I01 to I04 of the interference light beams Q1 to Q4 in the individual channels detected by the photodetectors 281 to 284.

Nevertheless, in practice, the amounts of phase shift of the ¼-wavelength plates 261 and 263 and the ½-wavelength plate 264 in the non-reference channels contain errors $\epsilon1$, $\epsilon3$, and $\epsilon4$ in the phase shifts of the individual channels. When the errors $\epsilon1$, $\epsilon3$, and $\epsilon4$ in the phase shifts are taken into consideration, the following equations (B1') hold in place of equations (B1).

[Mathematical Expression 5]

$$I1 = (as1 + ar1) + 2 \cdot \sqrt{as1} \cdot \sqrt{ar1} \cdot \sin(\phi - \pi/2 + \epsilon1)$$

$$I2 = (as2 + ar2) + 2 \cdot \sqrt{as2} \cdot \sqrt{ar2} \cdot \sin(\phi)$$

$$I3 = (as3 + ar3) + 2 \cdot \sqrt{as3} \cdot \sqrt{ar3} \cdot \sin(\phi + \pi/2 + \epsilon3)$$

$$I4 = (as4 + ar4) + 2 \cdot \sqrt{as4} \cdot \sqrt{ar4} \cdot \sin(\phi + \pi + \epsilon4) \quad \text{(B1')}$$

That is, when the light interferometers 20 are used without a special calibration step, the phase difference $\phi$ need be calculated on the basis of the equations (B1') containing twelve unknown parameters including the phase difference φ serving as a measurement target. Then, the phase difference φ need be calculated with a large number of assumptions and approximations, and hence the precision in the calculated phase difference φ is degraded. Thus, in the shape measurement employing the shape determining device X2, shape measurement for the to-be-measured object 1 is performed after a relatively simple device calibration step for the purpose of obtaining a phase difference φ with precision.

A shape measurement method according to a first implementation example executed by using the shape determining device X2 is described below with reference to the flow chart shown in FIG. 8. Here, S11, S12, S13, . . . described below are identification symbols for the individual steps in the shape measurement.

As described below, in the shape measurement method according to the first implementation example employing the shape determining device X2, first, device calibration steps (S11 to S14) for achieving a precise phase difference φ are executed. Then, shape measurement steps (S15 to S19) for the to-be-measured object 1 are executed. At the device calibration steps, first, a predetermined object for calibration is arranged and held at the measurement position (S11). The measurement position in the shape determining device X2 is located in a space between the two light interferometers 20. The object for calibration may be a to-be-measured object 1 which is the first target of shape measurement, or alternatively may be an object prepared separately.

Further, the arrangement of the object for calibration into the measurement position is achieved such that the object for calibration is supported at the movable support device Z2, for example, by operation of an operator or alternatively by a conveying machine provided with a manipulator for conveying the to-be-measured object 1.

In the following description, the state that the object for calibration has been arranged at the measurement position is referred to as a first arrangement state.

Then, in a state that the optical path length of the object light beam Ps and the reference light beam Pr is maintained at constant in the first arrangement state, a polarizing plate holding angle adjustment step described below (S12) is executed. Here, the state that the optical path length of the object light beam Ps and the reference light beam Pr is maintained at constant indicates a state that the reference plate 24 and the object for calibration are held free from vibrations. It is needless to say that the positions of the other optical devices that could affect the optical path length of the object light beam Ps and the reference light beam Pr are also fixed.

The polarizing plate holding angle adjustment step is a step of adjusting individually the holding angles for the four polarizing plates 271 to 274 such that the detected intensity of the reference light beam Pr in a state that the object light beam Ps is blocked and the detected intensity of the object light beam Ps in a state that the reference light beam Pr is blocked agree with each other for each of the four photodetectors 281 to 284.

The blocking of the object light beam Ps and the reference light beam Pr is performed by the two light beam blocking mechanisms 62. Further, the adjustment of the holding angles of the four polarizing plates 271 to 274 is performed by the holding angle adjusting mechanisms 61.

In the following description, the difference between the detected intensity of the reference light beam Pr in a state that the object light beam Ps is blocked and the detected intensity of the object light beam Ps in a state that the reference light beam Pr is blocked is referred to as a beam-to-beam light intensity difference.

When the polarizing plate holding angle adjustment step at step S12 is executed, as1=ar1, as2=ar2, as3=ar3, and as4=ar4 hold in equations (B1') described above. In this case, I1 to I4 in equations (B1') are the values of the output signals of the amplifiers 63 of the four channels after the polarizing plate holding angle adjustment step.

For example, the phase difference calculating computer 4 calculates the beam-to-beam light intensity difference on the basis of the detected intensities of the four photodetectors 281 to 284, and then outputs a change instruction for the holding angle of each of the polarizing plates 271 to 274 to each of the four automatic holding angle adjusting mechanisms 61 such that the beam-to-beam light intensity difference becomes equal to 0 or a value sufficiently approximated as 0. Alternatively, the phase difference calculating computer 4 serially calculates the beam-to-beam light intensity difference for each of the four photodetectors 281 to 284, and then displays the calculation result on a predetermined display device. Then, the operator checks the displayed beam-to-beam light intensity difference and then performs adjustment operation of changing the holding angles of the polarizing plates 271 to 274 onto the four manually-operated holding angle adjusting mechanisms 61 such that the beam-to-beam light intensity difference becomes equal to 0 or a value sufficiently approximated as 0.

At Step 12, the phase difference calculating computer 4 may adopt, for example, the values of the output signals of the amplifiers 63 whose amplification gains are set to be 0 dB (a unity gain), as the detected intensities of the two light beams to be compared at the polarizing plate holding angle adjustment step.

Here, at the polarizing plate holding angle adjustment step, only relative comparison is necessary whether the detected intensity of the reference light beam Pr in a state that the object light beam Ps is blocked and the detected intensity of the object light beam Ps in a state that the reference light beam Pr is blocked agree with each other. That is, the magnitudes of the absolute values of the two detected intensities are not of interest. Thus, even when the amplification gains set in the amplifiers 63 are not 0 dB, it is sufficient that the values of the signals obtained after the detection signals of the photodetectors 281 to 284 are amplified by the amplifiers 63 are adopted as the detected intensities of the two light beams to be compared at the polarizing plate holding angle adjustment step.

Further, after the execution of the polarizing plate holding angle adjustment step, in a state that a fluctuation of an amplitude greater than or equal to the wavelength λ of the object light beam Ps and the reference light beam Pr is imparted to the optical path length of the object light beam Ps or the reference light beam Pr in the first arrangement state, a linear correction gain setting step described below is executed (S13). The linear correction gain setting step (S13) is a step of setting up the amplification gains for the amplifiers 63, that is, the gains of linear correction such that the amplitude of a time series of variation of the intensities I1 to I4 agrees with each other in the four interference light beams Q1 to Q4 acquired by the amplifiers 63. The method of imparting a fluctuation of an amplitude greater than or equal to the wavelength λ to the optical path length of the object light beam Ps or the reference light beam Pr may be, for example, to impart vibrations of an amplitude greater than or equal to (λ/2) to the object for calibration or the reference plate 24. Further, the method of imparting vibrations to the object or the reference plate 24 for calibration may be, for example, to impart a shock to the object for calibration having elasticity or alternatively to impart vibrations to the support section for the object for calibration or the reference plate 24 by means of a predetermined driving source or the like. Nevertheless, when vibrations of an excessive amplitude are imparted to the object for calibration or the reference plate 24, generated inclination causes fluctuations in the light intensity of the object light beam Ps or the reference light beam Pr. Thus, the amplitude of the vibrations of the object for calibration or the reference plate 24 need be suppressed to be approximately 5 μm or smaller.

At the linear correction gain setting step (S13), for example, the phase difference calculating computer 4 continuously stores into the memory a time series of variation of the values of the output signals of the amplifiers 63 of the four channels in the first arrangement state, and calculates the amplitudes. Further, the phase difference calculating computer 4 automatically sets up the amplification gains respectively into the four amplifiers 63 such that the difference between the amplitudes of the four channels becomes equal to 0 or a value sufficiently approximated as 0.

Alternatively, the phase difference calculating computer 4 continuously stores into the memory a time series of variation of the values of the output signals of the amplifiers 63 of the four channels, and calculates the amplitudes and displays the calculation results on a predetermined display device. Then, the operator checks the amplitudes of the four displayed channels, and then manually sets up the amplification gains respectively into the four amplifiers 63 such that the difference of the amplitude becomes equal to 0 or a value sufficiently approximated as 0.

As a result of execution of the polarizing plate holding angle adjustment step (S12) and the linear correction gain setting step (S13), as1=ar1=as2=ar2=as3=ar3=as4=ar4 is achieved in equations (B1') described above.

Thus, when the values of the output signals of the amplifiers 63 of the four channels after the execution of the polarizing plate holding angle adjustment step and the linear correction gain setting step are denoted by I1', I2', I3', and I4', the following equations (C1) hold. Here, in equations (C1), k is a constant (k=2×ar1).

[Mathematical Expression 6]

$$I1'=k+k\cdot\sin(\phi-\pi/2+\epsilon1)$$

$$I2'=k+k\cdot\sin(\phi)$$

$$I3'=k+k\cdot\sin(\phi+\pi/2+\epsilon3)$$

$$I4'=k+k\cdot\sin(\phi+\pi+\epsilon4) \quad (C1)$$

Here, the predetermined variable $\phi'$ is defined by the following equation (C2).

[Mathematical Expression 7]

$$\phi' = \tan^{-1}\left(\frac{I2'-I4'}{I3'-I1'}\right) \quad (C2)$$

Further, when equations (C1) hold, the following equation (C3) derived from equations (C1) holds.

[Mathematical Expression 8]

$$\phi' = \tan^{-1}\left(\frac{\sin(\phi)+\sin(\phi+\epsilon4)}{\cos(\phi+\epsilon3)+\cos(\phi+\epsilon1)}\right) \quad (C3)$$

Then, when the inverse function for calculating the phase difference $\phi$ is derived from equation (C3), the following equation (C4) is obtained.

[Mathematical Expression 9]

$$\phi = \tan^{-1}\left(\frac{\sin\phi'\cdot\{\cos(\epsilon1)+\cos(\epsilon3)\}-\cos(\phi')\cdot\sin(\epsilon4)}{\sin\phi'\cdot\{\sin(\epsilon1)+\sin(\epsilon3)\}+\cos\phi'\cdot\{1+\cos(\epsilon4)\}}\right) \quad (C4)$$

That is, when the measured values of the interference light beams Q1 to Q4 which are the output values of the amplifiers 63 of the four channels after the execution of the polarizing plate holding angle adjustment step (S12) and the linear correction gain setting step (S13) are denoted by I1', I2', I3', and I4', equation (C2) given above and equation (C4) given above hold.

Further, after the execution of the linear correction gain setting step (S13), the phase difference calculating computer 4 executes a phase shift error calculation step (S14) of calculating errors ε1, ε3, and ε4 of the phase shifts caused by the optical systems for phase shift 261, 263, and 264, and then storing the results into a predetermined memory. At the linear correction gain setting step (S13), in a state that the amplification gains of the amplifiers 63 are set up such that the amplitudes in the individual channels agree with each other, a time series of variation of the values of the output signals of the amplifiers 63 of the four channels in the first arrangement state is stored in the memory. At the phase shift error calculation step (S14), first, the phase difference calculating computer 4 calculates Lissajous waveform information on the basis of a time series of variation of the detected intensities of the interference light beams Q1 to Q4 of the four channels acquired through the amplifiers 63 having undergone the amplification gain adjustment at step S13.

Figure 10:
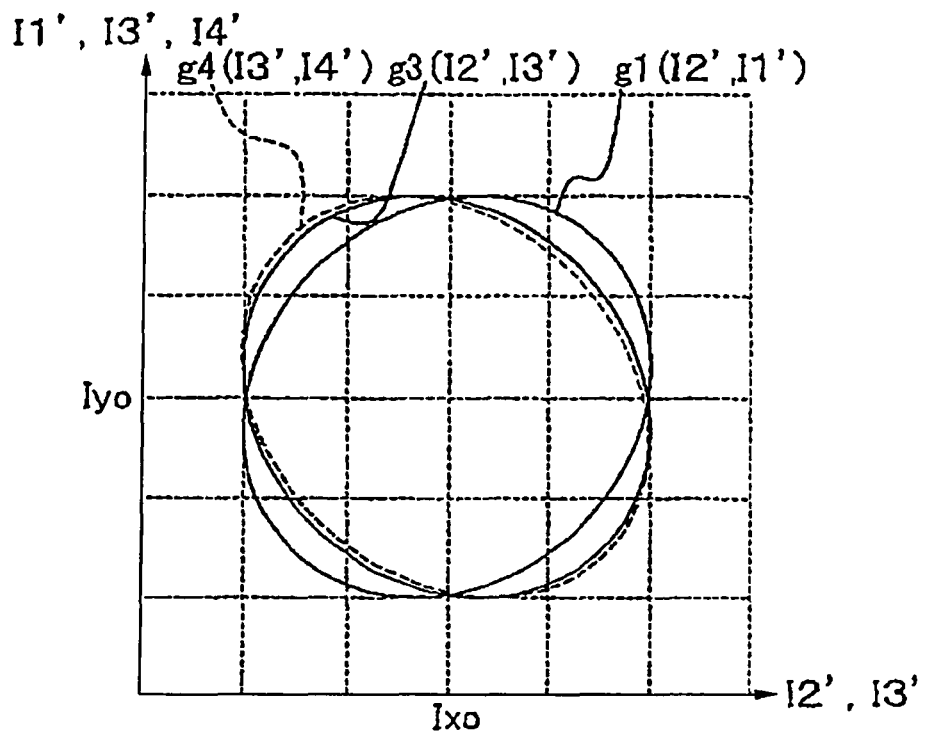
FIG. 10 is a diagram showing an example of a Lissajous waveform based on measured values of an interference light beam obtained by a shape determining device X2.

The Lissajous waveform serving as a target of processing at step S14 is a Lissajous waveform indicating: a relation between a time series of variation of intensity I2' of the interference light beam Q2 of the reference channel and a time series of variation of each of the intensities I1' and I3' of the interference light beams Q1 and Q3 of two non-reference channels; or a relation of a time series of variation of the intensities I3' and I4' of the interference light beams Q3 and Q4 of the non-reference channels. FIG. 10 shows an example of a Lissajous waveform observed at step S14. As shown in FIG. 10, the Lissajous waveform g1 based on the intensity I2' and the intensity I1', the Lissajous waveform g3 based on the intensity I2' and the intensity I3', and the Lissajous waveform g4 based on the intensity I3' and the intensity I4' are all have an elliptical shape.

Here, when the error of phase shift is ε1=0, the Lissajous waveform g1 becomes circular. Similarly, when the error of phase shift is ε3=0, the Lissajous waveform g3 become circular. Further, the difference between the errors of phase shift ε3 and ε4 is 0 (that is, ε4−ε3=0), the Lissajous waveform g4 become circular.

Figure 11:
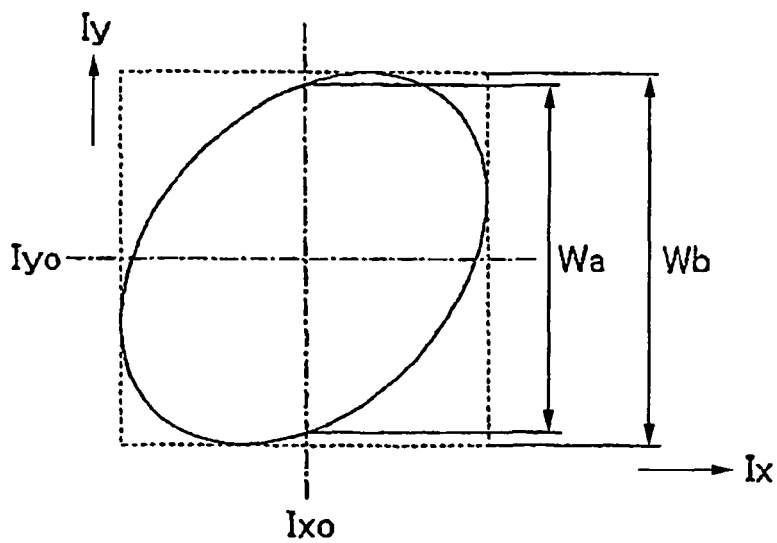
FIG. 11 is an explanation diagram of a relation between a Lissajous waveform and a phase difference of two measured values.

FIG. 11 is an explanation diagram of a relation between a Lissajous waveform and a phase difference of two measured values. In the Lissajous waveform where the measured value in the X-axis direction is denoted by Ix and the measured value in the Y-axis direction is denoted by Iy, the width in the Lissajous waveform Y-axis direction is denoted by Wb and the width in the Y-axis direction at the X-axis coordinate Ixo at the Lissajous waveform center position (Ixo, Iyo) is denoted by Wa. Then, the difference Δφ between the phase of the measured value Ix and the phase of the measured value Iy is expressed by $\sin^{-1}$ (Wa/Wb).

Thus, at step S14, the phase difference calculating computer 4 calculates (Wa1, Wb1), (Wa3, Wb3), and (Wa4, Wb4) which are the widths of the Lissajous waveforms g1, g3, and g4, respectively.

Further, the phase difference calculating computer 4 calculates the errors ε1, ε3, ε4 of the phase shifts in the individual channels where phase shift of −π/2, +π/2, and +π are performed, on the basis of the individual equations $\epsilon 1=\sin^{-1}$ (Wa1/Wb1)+(π/2), $\epsilon 3=\sin^{-1}$(Wa3/Wb3)−(π/2), and $\epsilon 4=\sin^{-1}$ (Wa4/Wb4)−(π/2), and then stores the calculation results into the memory. When the device calibration steps (S11 to S14) described above have been executed, equations (C2) and (C4) given above are satisfied and all errors ε1, ε3, and ε4 of the phase shifts in equation (C4) given above become known.

Thus, after the execution of the device calibration steps (S11 to S14), when the intensities I1', I2', I3', and I4' of the interference light beams Q1 to Q4 of the four channels are measured for the to-be-measured object 1 and then the measured values I1', I2', I3', and I4' and the errors ε1, ε3, and ε4 of the phase shifts are applied into equations (A1) composed of equations (C2) and (C4), the phase difference φ between the object light beam Ps and the reference light beam Pr can be calculated. In this phase difference φ, the errors ε1, ε3, and ε4 of the phase shifts have been removed.

Then, after the execution of the device calibration steps (S11 to S14) described above, shape measurement steps (S15 to S19) for the to-be-measured object 1 are executed.

At the shape measurement steps, first, similarly to step S11, the to-be-measured object 1 is arranged and held at the measurement position. Then, the movable support device Z2 starts movement of the supporting position of the to-be-measured object 1 in the two-dimensional directions (S15). Here, in a case that the object for calibration arranged at the measurement position at step S11 is the to-be-measured object 1, the step of exchange from the object for calibration to the to-be-measured object 1 serving as the first measurement target is skipped. The state that the to-be-measured object 1 has been arranged at the measurement position is referred to as a second arrangement state, hereinafter.

Then, the phase difference calculating computer 4 executes an interference-light-intensity-for-measurement detection step of detecting the intensities I1' to I4' of the interference light beams Q1 to Q4 of the four channels acquired by the amplifiers 63 in the second arrangement state, and then storing the detection result into a predetermined memory (S16). Further, the phase difference calculating computer 4 executes a phase difference calculation step of applying into equations (A1) composed of equations (C2) and (C4): the intensities I1' to I4' of the four interference light beams Q1 to Q4 acquired at the interference-light-intensity-for-measurement detection step (S16); and the errors ε1, ε3, and ε4 of the phase shifts the interference light beams of the three non-reference channels acquired at the shift error calculation step (S14), so as to calculate the phase difference φ between the object light beam Ps and the reference light beam Pr (S17). The phase difference φ calculated at this step S17 is transmitted to the shape calculating computer 6.

Then, the phase difference calculating computer 4 repeats the processing at steps S16 and S17 for all measurement points 1a and 1b in the to-be-measured object 1. Then, the shape calculating computer 6 determines whether the measurement has been completed for all measurement points 1a and 1b (S18).

Then, when the measurement processing has been completed for all measurement points 1a and 1b (S16 and S17),
the shape calculating computer 6 executes a shape calculation processing of calculating the thickness distribution of the to-be-measured object 1 on the basis of the distribution of the difference (φa−φb) between the phase differences φa and φb having been acquired for all measurement points 1a and 1b (S19).

Further, when the shape measurement steps (S15 to S19) are to be executed after the to-be-measured object 1 is replaced, the device calibration steps (S11 to S14) need not be performed before the second and the following occasions of the shape measurement steps (S15 to S19).

Figure 8:
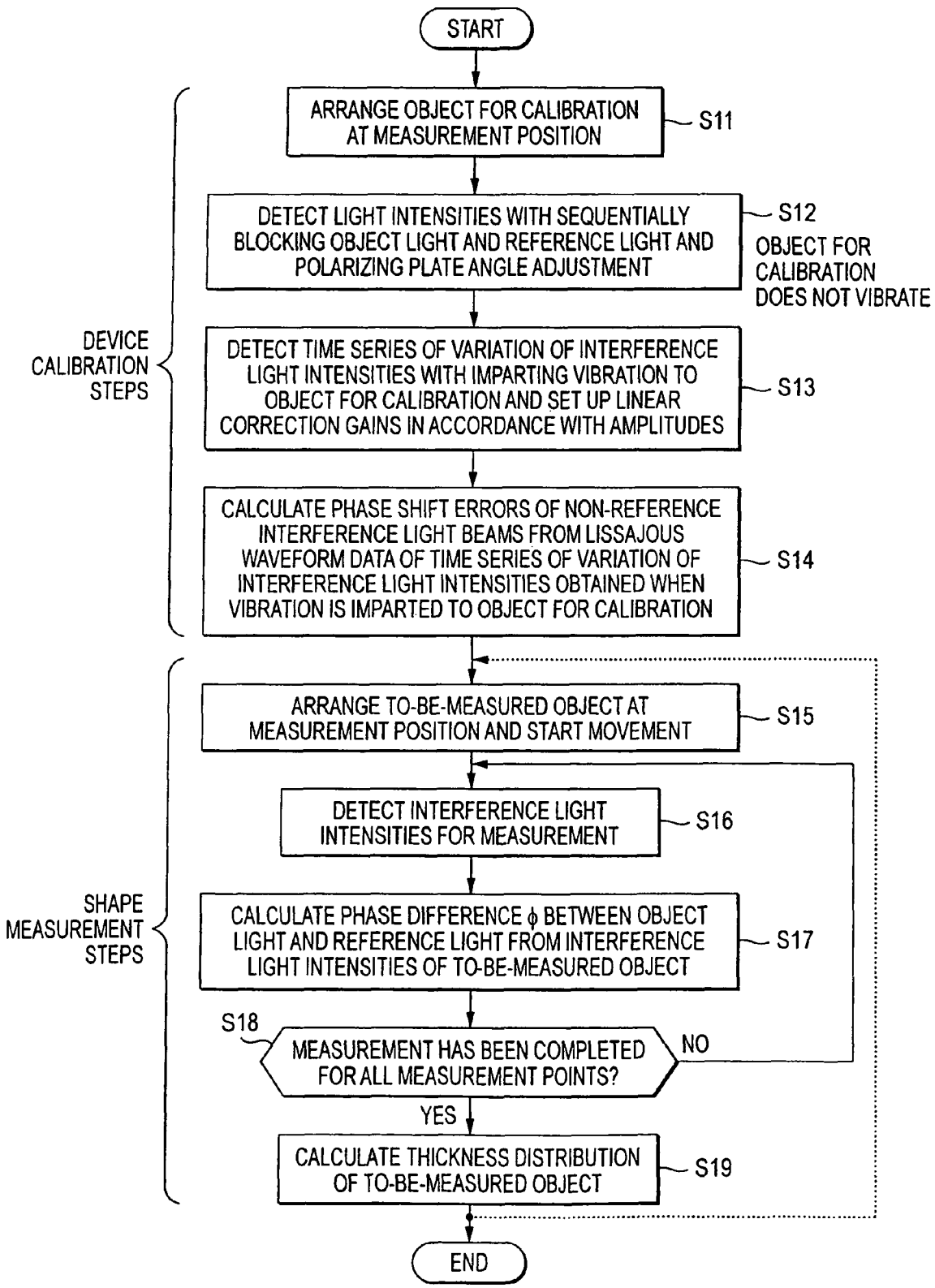
FIG. 8 is a flow chart showing a procedure of a shape measurement method according to a first implementation example executed by using a shape determining device X2.

By virtue of the shape measurement method described above according to the first implementation example of FIG. 8, the measurement result φ can be acquired simply without an influence of the errors ε1, ε3, and ε4 of the phase shifts that could be caused when phase shift is performed optically by using the plurality of polarizing plates 261, 263, and 264.

A shape measurement method according to a second implementation example executed by using the shape determining device X2 is described below with reference to the flow chart shown in FIG. 9. Here, S21, S22, S23, . . . described below are identification symbols for the individual steps in the shape measurement.

As described below, also in the shape measurement method according to the second implementation example employing the shape determining device X2, first, device calibration steps (S21 to S24) for achieving a precise phase difference φ are executed. Then, shape measurement steps (S25 to S29) for the to-be-measured object 1 are executed. In the shape measurement method according to the second implementation example, as described later, the four amplifiers 63 and the phase difference calculating computer 4 serve as the light intensity correcting unit for independently performing linear correction based on the amplification gains and offset correction based on the offset correction values onto the signals of the four light intensities acquired by the photodetectors 281 to 284.

At the device calibration steps, first, similarly to step S11, the object for calibration is arranged and held at the measurement position (S21). This realizes the first arrangement state.

Then, in a state that the optical path length of the object light beam Ps and the reference light beam Pr is maintained at constant in the first arrangement state, a linear correction gain setting step described below is executed (S22).

The linear correction gain setting step (S22) is a step of setting up the amplification gains, that is, the gains of linear correction, for the four amplifiers 63 such that the intensities of the four object light beams Ps acquired by the four amplifiers 63 agree with each other in a state that the reference light beam Pr alone is blocked. The blocking of the reference light beam Pr is performed through the light beam blocking mechanism 62 on the reference light beam Pr side.

At the linear correction gain setting step (S22), for example, in a state that the reference light beam Pr is blocked in the first arrangement state, the phase difference calculating computer 4 continuously comparing the values of the output signals of the amplifiers 63 of the four channels and automatically sets up the amplification gains respectively into the four amplifiers 63 such that each difference becomes equal to 0 or a value sufficiently approximated as 0.

Alternatively, the phase difference calculating computer 4 calculates the differences of the values of the output signals of the amplifiers 63 of the four channels and displays the calculation results on a predetermined display device. Then, the operator continuously checks the displayed differences of the values of the output signals of the amplifiers 63 of the four channels and manually sets up the amplification gains respectively into the four amplifiers 63 such that each difference becomes equal to 0 or a value sufficiently approximated as 0.

As a result of the execution of the linear correction gain setting step (S22), when the values of the output signals of the amplifiers 63 of the individual channels after the amplification gain adjustment are denoted by I1', I2', I3', and I4', the following equations (D1) is satisfied in which as1=as2=as3=as4=as is adopted in equations (B1').

[Mathematical Expression 10]

$I1'=(as+ar1)+2\cdot\sqrt{as}\cdot\sqrt{ar1}\cdot\sin(\phi-\pi/2+\epsilon1)$ $I2'=(as+ar2)+2\cdot\sqrt{as}\cdot\sqrt{ar2}\cdot\sin(\phi)$ $I3'=(as+ar3)+2\cdot\sqrt{as}\cdot\sqrt{ar3}\cdot\sin(\phi+\pi/2+\epsilon3)$ $I4'=(as+ar4)+2\cdot\sqrt{as}\cdot\sqrt{ar4}\cdot\sin(\phi+\pi+\epsilon1)$ (D1)

Then, after the execution of the linear correction gain setting step (S22), an offset correction value setting step described below is executed in the first arrangement state (S23).

The offset correction value setting step (S23) is a step of setting up, as offset correction values in the phase difference calculating computer 4, the intensities ar1 to ar4 of the four reference light beams Pr acquired by the amplifiers 63 in a state that the optical path length of the reference light beam Pr is maintained at constant and the object light beam Ps alone is blocked. Here, the phase difference calculating computer 4 performs offset correction of subtracting the intensities ar1 to ar4 of the reference light beam Pr from the output values of the four amplifiers 63. The values ar1 to ar4 are stored into the memory of the phase difference calculating computer 4.

Here, the measured values for the intensities of the interference light beams Q1 to Q4 of the individual channels where linear correction and offset correction have been performed by the amplifiers 63 and the phase difference calculating computer 4 at the linear correction gain setting step (S22) and the offset correction value setting step (S23) are denoted by I1", I2", I3", and I4". Then, the following equations (D2) hold where the offset correction values ar1 to ar4 have been subtracted respectively from the right-hand sides and the left-hand sides of the four equations (D1) described above.

[Mathematical Expression 11]

$I1''=as+2\cdot\sqrt{as}\cdot\sqrt{ar1}\cdot\sin(\phi-\pi/2+\epsilon1)$ $I2''=as+2\cdot\sqrt{as}\cdot\sqrt{ar2}\cdot\sin(\phi)$ $I3''=as+2\cdot\sqrt{as}\cdot\sqrt{ar3}\cdot\sin(\phi+\pi/2+\epsilon3)$ $I4''=as+2\cdot\sqrt{as}\cdot\sqrt{ar4}\cdot\sin(\phi+\pi+\epsilon4)$ (D2)

Here, a predetermined variable Z is defined by the following equation (D3).

[Mathematical Expression 12]

$$Z = \frac{I2''-I4''}{I3''-I1''}$$ (D3)

Further, when equations (D2) hold, the following equation (D4) derived from equations (D2) holds.

[Mathematical Expression 13]

$$Z = \frac{\sqrt{ar2}\cdot\sin(\phi)-\sqrt{ar4}\cdot\sin(\phi+\pi/2+\varepsilon4)}{\sqrt{ar3}\cdot\sin(\phi+\pi/4+\varepsilon3)-\sqrt{ar1}\cdot\sin(\phi-\pi/4+\varepsilon1)}$$ (D4)

Then, when the inverse function for calculating the phase difference $\phi$ is derived from equation (D4), the following equation (D5) is obtained.

[Mathematical Expression 14]

$$\phi = \tan^{-1}\left(\frac{\sqrt{ar4}\cdot\sin(\varepsilon4)-Z\cdot(-\sqrt{ar3}\cdot\cos(\varepsilon3)+\sqrt{ar1}\cdot\cos(\varepsilon1))}{Z\cdot\{-\sqrt{ar3}\cdot\sin(\varepsilon3)-\sqrt{ar1}\cdot\sin(\varepsilon1)\}-\sqrt{ar2}-\cos(\varepsilon4)}\right)$$ (D5)

That is, after the execution of the linear correction gain setting step (S22) and the offset correction value setting step (S23), when the measured values of the interference light beams Q1 to Q4 of the four channels where linear correction and offset correction have been performed by the amplifiers 63 and the phase difference calculating computer 4 are denoted by I1", I2", I3", and I4", equations (D3) and (D5) given above hold.

Further, after the execution of the offset correction value setting step (S23), the phase difference calculating computer 4 executes a phase shift error calculation step (S24) of calculating errors $\epsilon1$, $\epsilon3$, and $\epsilon4$ of the phase shifts caused by the optical systems for phase shift 261, 263, and 264, and then storing the results into a predetermined memory. In the phase shift error calculation step (S24), the phase difference calculating computer 4 executes the processing described below.

First, similarly to the above-mentioned step S13, in the first arrangement state, in a state that a fluctuation of an amplitude greater than or equal to the wavelength λ of the object light beam Ps and the reference light beam Pr is imparted to the optical path length of the object light beam Ps or the reference light beam Pr, the phase difference calculating computer 4 stores into the memory of the phase difference calculating computer 4 a time series of variation of each of the corrected intensities of the four interference light beams Q1 to Q4 obtained by the linear correction of the amplifiers 63 and the offset correction of the phase difference calculating computer 4.

Further, similarly to the above-mentioned step S14, the phase difference calculating computer 4 calculates Lissajous waveform information acquired from the time series of variation of the intensities the interference light beam Q2 of the reference channel and the interference light beams Q1, Q3, and Q4 of the three non-reference channels stored in the memory. As a result, the widths (Wa1, Wb2), (Wa3, Wb3), (Wa4, Wb4) are calculated for the three Lissajous waveforms corresponding to the measured values of three non-reference channels Further, the phase difference calculating computer 4 calculates the errors $\epsilon1$, $\epsilon3$, $\epsilon4$ of the phase shifts in the individual channels where phase shift of $-\pi/2$, $+\pi/2$, and $+\pi2$ are performed, on the basis of the individual equations $\epsilon1=\sin^{-1}(Wa/Wb)+(\pi/2)$, $\epsilon3=\sin^{-1}(Wa/Wb)-(\pi/2)$, and $\epsilon4=[\sin^{-1}(Wa/Wb)+\epsilon3]-(\pi/2)$, and then stores the calculation results into the memory. As a result of execution of the device calibration steps (S21 to S24) described above, equations (D3) and (D5)

given above are satisfied and all errors ϵ1, ϵ3, and ϵ4 of the phase shifts in equation (D5) given above become known.

Thus, after the executing of the device calibration steps (S21 to S24), when the intensities I1″, I2″, I3″, and I4″ of the interference light beams Q1 to Q4 of the four channels are measured for the to-be-measured object 1 and then the measured values I1″, I2″, I3″, and I4″, the errors ϵ1, ϵ3, and ϵ4 of the phase shifts, and the intensities ar1 to ar4 of the reference light beam Pr in the individual channels which are the offset correction values are applied into equations (A2) given above composed of equations (D3) and (D5) given above, the phase difference φ between the object light beam Ps and the reference light beam Pr can be calculated. Here, in the phase difference φ, the errors ϵ1, ϵ3, and ϵ4 of the phase shifts have been removed.

Then, after the execution of the device calibration steps (S21 to S24) described above, shape measurement steps (S25 to S29) for the to-be-measured object 1 are executed.

At the shape measurement steps, first, similarly to step S15, the to-be-measured object 1 is arranged and held at the measurement position. Then, the movable support device Z2 starts movement of the supporting position of the to-be-measured object 1 in the two-dimensional directions (S25). This realizes the second arrangement state.

Here, in a case that the object for calibration arranged at the measurement position at step S1 is the to-be-measured object 1, the step of exchange from the object for calibration to the to-be-measured object 1 serving as the first measurement target is skipped.

Then, in the second arrangement state, the phase difference calculating computer 4 executes an interference-light-intensity-for-measurement detection step of detecting the intensities I1″ to I4″ of the interference light beams Q1 to Q4 of the four channels acquired by the linear correction of the amplifiers 63 and the offset correction of the phase difference calculating computer 4, and then storing the detection results into a predetermined memory (S26).

Further, the phase difference calculating computer 4 executes a phase difference calculation step of applying into equations (A2) composed of equations (D3) and (D5) the corrected intensities I1″ to I4″ of the four interference light beams Q1 to Q4 acquired at the interference-light-intensity-for-measurement detection step (S26), the errors ϵ1, ϵ3, and ϵ4 of the phase shifts of the interference light beams of the three non-reference channels acquired at the phase shift error calculation step (S24), and the offset correction values ar1 to ar4, so as to calculate the phase difference φ between the object light beam Ps and the reference light beam Pr (S27). The phase difference φ calculated at this step S27 is transmitted to the shape calculating computer 6. Then, the phase difference calculating computer 4 repeats the processing at steps S26 and S27 for all expected measurement points 1a and 1b in the to-be-measured object 1. Then, the shape calculating computer 6 determines whether the measurement has been completed for all measurement points 1a and 1b (S28).

Then, when the measurement processing has been completed for all measurement points 1a and 1b (S26 and S27), the shape calculating computer 6 executes a shape calculation processing of calculating the thickness distribution of the to-be-measured object 1 on the basis of the distribution of the difference (φa−φb) between the phase differences φa and φb having been acquired for all measurement points 1a and 1b (S29).

Also in the shape measurement method according to the second implementation example, it is sufficient that the device calibration steps S21 to S24 are performed once before the shape measurement of one or more to-be-measured objects 1.

Figure 9:
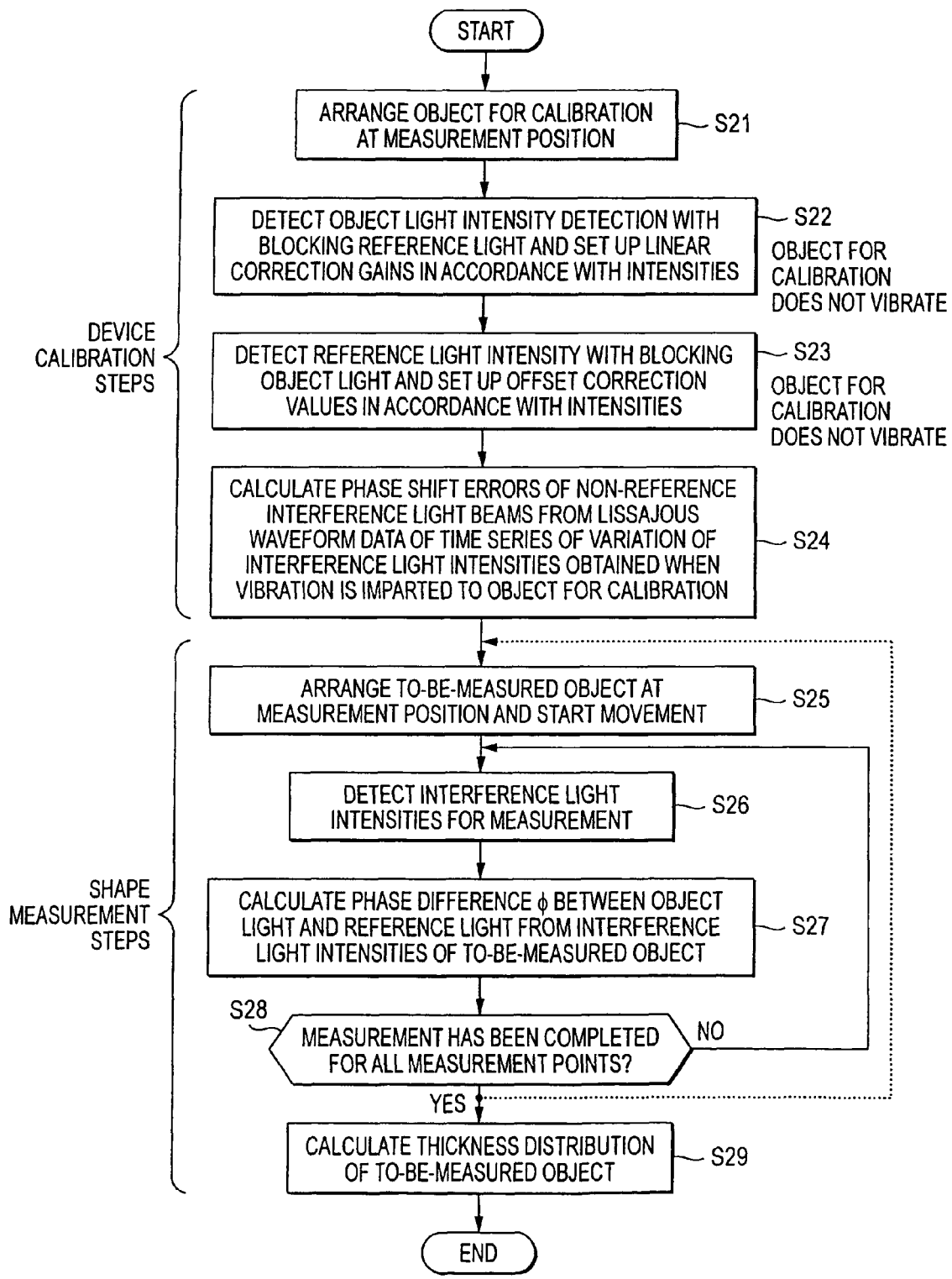
FIG. 9 is a flow chart showing a procedure of a shape measurement method according to a second implementation example executed by using a shape determining device X2.

By virtue of the shape measurement method described above according to the second implementation example of FIG. 9, the measurement result φ can similarly be acquired simply without an influence of the errors ϵ1, ϵ3, and ϵ4 of the phase shifts that could be caused when phase shift is performed optically by using the plurality of polarizing plates 261, 263, and 264.

In the embodiments described above, the shape determining device X2 provided with the two light interferometers 20 has been described. Instead, a shape determining device provided with one light interferometer 20 may be employed so that the surface shape (height distribution) of one surface of the to-be-measured object 1 may be measured.

Further, the function of offset correction for the intensity of the light beam may be provided in the amplifiers 63 in place of the phase difference calculating computer 4.

INDUSTRIAL APPLICABILITY

The present invention is applicable to a measuring device for the thickness distribution of a to-be-measured object such as a semiconductor wafer.

Further, the present invention is applicable to a shape measurement method that the surface shape of a to-be-measured object is measured by using a homodyne interferometer.

The present invention has been described above in detail with reference to particular embodiments. However, it is clear for the person skilled in the art that various kinds of modifications and corrections can be performed without departing from the spirit and the scope of the present invention. This application is based on a Japanese patent application (Patent Application No. 2009-016396) filed on Jan. 28, 2009 and a Japanese patent application (Patent Application No. 2009-135973) filed on Jun. 5, 2009. The contents thereof are incorporated herein by reference.

DESCRIPTION OF REFERENCE NUMERALS

X1, X2: shape determining device
Y1, Y2: interference light measuring section
Z1, Z2: movable support device
1: to-be-measured object
1a: A-surface measurement point
1b: B-surface measurement point
2: laser light source
3: polarizing beam splitter
a4: first computer
b4: second computer
4: phase difference calculating computer
5: third computer
6: shape calculating computer
7: movement control device
a11 to a13, b11, b12, 11: mirror
a20, b20, 20: light interferometer
a21, b21, 21: polarizing beam splitter
a22, a23, b22, b23, 22, 23: ¼-wavelength plate
a24, b24, 24: reference plate
a31, b31, 31: ½-wavelength plate
a32, b32, 32: condenser lens
a251 to a252, b251 to b252, 251, 252: unpolarized beam splitter
a261, a263, b261, b263, 261, 263: ¼-wavelength plate
a264, b264, 264: ½-wavelength plate
a271 to a274, b271 to b274, 271 to 274: polarizing plate a281 to a284, b281 to b284, 281 to 284: photodetector
P0, Pi: light beam
Pax, Pbx, Px: non-interference light beam
Pa1 to Pa4, Pb1 to Pb4, P1 to P4: branched light beam of non-interference light beam
Qa1 to Qa4, Qb1 to Qb4, Q1 to Q4: interference light beam

The invention claimed is:

1. A shape determining device, comprising:

first and second homodyne interferometers respectively provided for front and back surfaces of an object arranged at a predetermined measurement position, the first homodyne interferometer detecting intensities of first interference light beams each obtained by interference between a first reference light beam and a first object light beam, the second homodyne interferometer detecting intensities of first interference light beams each obtained by interference between a second reference light beam and a second object light beam, the first reference light beam being obtained when light emitted from a predetermined light source is branched into a first light beam that is guided toward the front surface of the object and a second light beam is guided toward the back surface of the object, the first light beam is branched into third and fourth light beams, and the third light beam is reflected by a first reference surface, the first object light beam being obtained by reflection of the fourth light beam at a corresponding measurement site on the front surface of the object, the second reference light beam being obtained when the second light beam is branched into fifth and sixth light beams and the fifth light beam is reflected by a second reference surface, the second object light beam being obtained by reflection of the sixth light beam at the corresponding measurement site on the back surface of the object; and a thickness distribution calculator that calculates a thickness distribution of the object based on the intensities of the first and second interference light beams detected for a plurality of the measurement sites by the first and second homodyne interferometers by changing a relative position of the object in two-dimensional directions relative to the first and second homodyne interferometers, and wherein each of the first and second homodyne interferometers includes:

a first optical system for non-interference light beam acquisition, the first optical system of the first homodyne interferometer, for detecting the intensity of each first interference light beam, branching the first light beam into the third and fourth light beams and then projects the third light beam onto the first reference surface and the fourth light beam onto the corresponding measurement site on the front surface of the object, so as to acquire a non-interference light beam that contains the first reference light beam and the first object light beam as mutually orthogonal polarization components, the first optical system of the second homodyne interferometer, for detecting the intensity of each second interference light beam, branching the second light beam into the fifth and sixth light beams and then projecting the fifth light beam onto the second reference surface and the sixth light beam onto the corresponding measurement site on the back surface of the object, so as to acquire a non-interference light beam that contains the second reference light beam and the second object light beam as mutually orthogonal polarization components;

a second optical system for non-interference light beam branching that branches each non-interference light beam acquired by the first optical system into three or more branched non-interference light beams;

a third optical system for phase shift that imparts a change in a phase difference between the orthogonal polarization components by means of a birefringent element for one or more of the three or more branched non-interference light beams for each non-interference light beam acquired so as to generate a diverse phase difference between the polarization component of the corresponding reference light beam and the polarization component of the corresponding object light beam in each of the three or more branched non-interference light beams;

a fourth optical system for interference light beam extraction that extracts a polarization component having a common angle with reference to polarization directions of the corresponding reference light beam and the corresponding object light beam from each of the three or more branched non-interference light beams after the branched non-interference light beam passes through the third optical system, and thereby extracts an interference light beam between the corresponding reference light beam and the corresponding object light beam; and an interference light intensity detecting unit that detects an intensity of each interference light beam extracted by the fourth optical system, and wherein the thickness distribution calculator includes:

a phase difference calculating unit that, for each of the interference light beams for which the intensity is detected by the interference light intensity detecting unit of the first and second homodyne interferometers, calculates a phase difference between the polarization components of the corresponding reference light beam and the corresponding object light beam in the corresponding non-interference light beam based on the intensity of the interference light beam; and a thickness distribution calculating unit that calculates the thickness distribution of the object based on a distribution of the phase differences calculated based on the intensities of the first and second interference light beams detected for the plurality of measurement sites by the phase difference calculating unit.

2. The shape determining device according to claim 1, wherein the second optical system of each homodyne interferometer branches each non-interference light beam acquired from the first optical system of the homodyne interferometer into a first branched light beam, a second branched light beam, a third branched light beam, and a fourth branched light beam by two beam-splitting stages, wherein the third optical system of each homodyne interferometer imparts each change of $-\frac{1}{4}$ wavelength, $+\frac{1}{4}$ wavelength, and $+\frac{1}{2}$ wavelength to the phase difference between the polarization component of the reference light beam and the polarization component of the object light beam in each of the first branched light beam, the third branched light beam, and the fourth branched light beam with reference to the second branched light beam, and wherein the phase difference calculating unit applies into an equation (F1) detected intensities I1, I2, I3, and I4 of the interference light beams for the first branched light beam having received the phase difference change of $-\frac{1}{4}$ wavelength, the second branched light beam adopted as a reference, the third branched light beam having received the phase difference change of $+\frac{1}{4}$ wavelength, and the fourth branched light beam having received the phase difference change of +½ wavelength for the front and the back surfaces of the object at each of the measurement sites, and thereby calculates a phase difference Φ between the polarization components of the reference light beam and the object light beam in each corresponding non-interference light beam acquired by the first optical system of each homodyne interferometer, where the equation F1 is:

$$\Phi = \tan^{-1}[(I2-I4)/(I3-I1)] \quad (F1)$$

and where, for the detected intensities I1, I2, I3, and I4 of each interference light beam, values are employed that have been adjusted in advance such that an offset and an amplitude of intensity of each phase difference change are identical when a fluctuation is imparted to the phase difference between the polarization components of the reference light beam and the object light beam in each corresponding non-interference light beam acquired by the first optical system of each homodyne interferometer.

3. The shape determining device according to claim 1, The shape determining device according to claim 1, wherein in each of the first and second homodyne interferometers, optical path lengths of the branched non-interference light beams obtained by branching from each non-interference light beam acquired from the first optical system of the homodyne interferometer is set identical.

4. The shape determining device according to claim 3, wherein each of the first and second homodyne interferometers includes a condenser lens that is arranged in an optical path of the corresponding interference light beams and the object light beams for the corresponding interference light beams between the first optical system of the homodyne interferometer and the respective measurement sites of the corresponding interference light beams, and wherein the condenser lens of each homodyne interferometer has a focal point at the measurement site for each of the corresponding interference light beams.

5. A shape determining device, comprising:
an optical system for non-interference light beam branching that branches a non-interference light beam into four branched non-interference light beams, where the non-interference light beam contains as polarization components an object light beam obtained by reflection of a first light beam at a measurement site on an object and a reference light beam;
an optical system for phase shift that generates a diverse phase difference between the polarization component of the reference light beam and the polarization component of the object light beam in each of the four branched light beams of the non-interference light beam;
four polarizing plates each of which extracts an interference light beam between the reference light beam and the object light beam from each of the four branched light beams of the non-interference light beam having passed through the optical system for phase shift;
a light intensity detecting unit that detects an intensity of the interference light beam extracted by each of the polarizing plates having passed through the polarizing plates;
a light intensity correcting unit that performs correction independently onto each of the four intensities acquired by the light intensity detecting unit;
a polarizing plate holding unit that holds each of the polarizing plates at a variable angle;
a light beam blocking unit that blocks each of the object light beam and the reference light beam;
a gain setting unit that sets up a correction gain for the light intensity correcting unit such that, when a time series of fluctuations is imparted to an optical path length of the object light beam or the reference light beam in a first arrangement state in which the object for calibration is arranged at the measurement site, amplitudes of time series changes in the intensities of the four interference light beams corrected by the light intensity correcting unit agree with each other;
a phase shift error calculating unit that, when a time series of fluctuations is imparted to the optical path length of the object light beam or the reference light beam in the first arrangement state, calculates an error in the phase difference generated by the optical system for phase shift based on the intensities of the four interference light beams corrected by the light intensity correcting unit; and
a phase difference calculating unit that, in a second arrangement in which the object is arranged at the measurement site, calculates a phase difference between the object light beam and the reference light beam for the object based on the intensities of the interference light beams corrected by the light intensity correcting unit and the error in the phase difference calculated by the phase shift error calculating unit.

6. The shape determining device according to claim 5, wherein
in the optical system for phase shift, among the four branched non-interference light beams obtained by branching, phase differences of −90°, +90°, and +180° are respectively set to three of the branched non-interference light beams, each branched non-interference light beam to which a phase difference is set serving as a source of a non-reference interference light beam relative to the fourth branched non-interference light beam serving as a source of a reference interference light beam, and wherein
the phase difference calculating unit inputs to a set of equations (A1) an intensity I2' of the reference interference light beam and intensities I1', I3', and I4' of the three non-reference interference light beams as well as errors ε1, ε3, and ε4 of the phase differences of the three non-reference interference light beams, and thereby calculates a phase difference φ between the object light beam and the reference light beam in the object, where the equations A1 are:

$$\begin{aligned}\phi' &= \tan^{-1}\left(\frac{I2'-I4'}{I3'-I1'}\right) \\ \phi &= \tan^{-1}\left(\frac{\sin\phi'\cdot\{\cos(\varepsilon 1)+\cos(\varepsilon 3)\}-\cos(\phi')\cdot\sin(\varepsilon 4)}{\sin\phi'\cdot\{\sin(\varepsilon 1)+\sin(\varepsilon 3)\}+\cos\phi'\cdot\{1+\cos(\varepsilon 4)\}}\right)\end{aligned} \quad (A1)$$

7. The shape determining device according to claim 5, further comprising a polarizing plate holding angle adjusting unit that, as for the detected intensities obtained by the light intensity detecting unit in a state that the optical path length of the object light beam or the reference light beam is maintained at a constant length in the first arrangement state, adjusts the angle at which each of the polarizing plates is held in the polarizing plate holding unit such that a detected intensity of the reference light beam at a time that the object light beam is blocked by the light beam blocking unit and a detected intensity of the object light beam at a time that the reference light beam is blocked by the light beam blocking unit agree with each other.

8. A shape determining device, comprising:
an optical system for non-interference light beam branching that branches a non-interference light beam into four non-interference light beams, where the non-interference light beam contains as polarization components an object light beam obtained by reflection of a first light beam at a measurement site on an object and a reference light beam;
an optical system for phase shift that generates a diverse phase difference between the polarization component of the reference light beam and the polarization component of the object light beam in each of the four branched light beams of the non-interference light beam;
four polarizing plates each of which extracts an interference light beam between the reference light beam and the object light beam from each of the four branched light beams of the non-interference light beam having passed through the optical system for phase shift;
a light intensity detecting unit that detects an intensity of the interference light beam extracted by each of the polarizing plates having passed through the polarizing plates;
a light intensity correcting unit that performs correction independently onto each of the four intensities acquired by the light intensity detecting unit;
a light beam blocking unit that blocks each of the object light beam and the reference light beam;
a gain setting unit that sets up a correction gain for the light intensity correcting unit such that, when an optical path length of the object light beam is maintained at a constant level and the reference light beam is blocked by the light beam blocking unit in a first arrangement state in which the object for calibration is arranged at the measurement site, intensities of the four object light beams acquired by the light intensity correcting unit agree with each other;
an offset correction value setting unit that sets up, as offset correction values for the light intensity correcting unit, intensities of the four reference light beams acquired by the light intensity correcting unit when an optical path length of the reference light beam is maintained at a constant level and the object light beam is blocked by the light beam blocking unit in the first arrangement state;
a phase shift error calculating unit that, when a time series of fluctuations is imparted to the optical path length of the object light beam or the reference light beam in the first arrangement state, calculates an error in the phase difference generated by the optical system for phase shift based on the intensities of the four interference light beams corrected by the light intensity correcting unit; and
a phase difference calculating unit that, in a second arrangement state in which the object is arranged at the measurement site, calculates a phase difference between the object light beam and the reference light beam for the object based on the intensities the four interference light beams corrected by the light intensity correcting unit and the error in the phase difference calculated by the phase shift error calculating unit.

9. The shape determining device according to claim 8, wherein
in the optical system for phase shift, among the four branched non-interference light beams obtained by branching, phase differences of −90°, +90°, and +180° are respectively set to three of the branched non-interference light beams, each branched non-interference light beam to which a phase difference is set serving as a source of a non-reference interference light beam relative to the fourth branched non-interference light beam serving as a source of a reference interference light beam, and wherein
the phase difference calculating unit applies into the following equations (A2) an intensity $I2''$ of the reference interference light beam and intensities $I1''$, $I3''$, and $I4''$ of the three non-reference interference light beams as well as errors $\epsilon1$, $\epsilon3$, and $\epsilon4$ of the phase shifts of the three non-reference interference light beams and the offset correction values $ar1$, $ar2$, $ar3$, and $ar4$ set up by the offset correction value setting unit, and thereby calculates a phase difference $\phi$ between the object light beam and the reference light beam in the to-be-measured object
the phase difference calculating unit inputs to a set of equations (A2) an intensity $I2''$ of the reference interference light beam and intensities $I1''$, $I3''$, and $I4''$ of the three non-reference interference light beams as well as errors $\epsilon2$, $\epsilon3$, and $\epsilon4$ of the phase differences of the three non-reference interference light beams and the offset correction values $ar1$, $ar2$, $ar3$, and $ar4$ set up by the offset correction value setting unit, and thereby calculates a phase difference $\phi$ between the object light beam and the reference light beam in the to be measured object, where the equations A2 are:

$$Z = \frac{I2'' - I4''}{I3'' - I1''} \quad \quad (A2)$$
$$\phi = \tan^{-1}\left(\frac{\sqrt{ar4} \cdot \sin(\varepsilon 4) - Z \cdot \left(-\sqrt{ar3} \cdot \cos(\varepsilon \hat{3})\right) + \sqrt{ar1} \cdot \cos(\varepsilon 1)}{Z \cdot \left\{-\sqrt{ar3} \cdot \sin(\varepsilon 3) - \sqrt{ar1} \cdot \sin(\varepsilon 1)\right\} - \sqrt{ar2} - \cos(\varepsilon 4)}\right).$$

10. The shape determining device according to claim 1, wherein
the second optical system of each of the first and second homodyne interferometers branches each non-interference light beam acquired by the first optical system of the homodyne interferometer into four branched non-interference light beams, wherein
the third optical system of each of the first and second homodyne interferometers generates a diverse phase difference between the polarization component of the corresponding reference light beam and the polarization component of the corresponding object light beam in each of the four branched light beams of each non-interference light beam acquired by the second optical system of the homodyne interferometer, wherein
the fourth optical system of each of the first and second homodyne interferometers is four polarizing plates each of which extracts an interference light beam between the reference light beam and the object light beam from each of the four branched light beams of each non-interference light beam acquired by the first optical system of the homodyne interferometer having passed through the third optical system of the homodyne interferometer, wherein
the interference light intensity detecting unit of each of the first and second homodyne interferometers detects the intensity of each of the four interference light beams extracted for each non-interference light beam acquired by the first optical system of the homodyne interferometer by the four polarizing plates of the fourth optical system of the homodyne interferometer, and wherein the shape determining device further comprises:

a light intensity correcting unit that performs correction independently onto each of the four light intensities acquired by the light intensity detecting unit of each of the first and second homodyne interferometers for each non-interference light beam acquired by the first optical system of the homodyne interferometer;

a polarizing plate holding unit that holds the polarizing plates of the fourth optical system of each of the first and second homodyne interferometers at a variable angle;

a light beam blocking unit that blocks each of the object light beam and the reference light beam of each non-interference light beam acquired by the first optical system of each of the first and second homodyne interferometers;

a gain setting unit that sets up a correction gain for the light intensity correcting unit such that, when a time series of fluctuations is imparted to an optical path length of the object light beam or the reference light beam of each non-interference light beam acquired by the first optical system of each of the first and second homodyne interferometers in a first arrangement state in which the object for calibration is arranged at the corresponding measurement site, amplitudes of time series changes in the intensities of the four interference light beams for each non-interference light beam acquired by the first optical system of the homodyne interferometer corrected by the light intensity correcting unit agree with each other;

a phase shift error calculating unit that, when a time series of fluctuations is imparted to the optical path length of the object light beam or the reference light beam of each non-interference light beam acquired by the first optical system of each of the first and second homodyne interferometers in the first arrangement state, calculates an error in the phase difference generated by the third optical system of the homodyne interferometer based on the intensities of the four interference light beams for the non-interference light beam corrected by the light intensity correcting unit; and a second phase difference calculating unit that, for each non-interference light beam acquired by the first optical system of each of the first and second homodyne interferometers, in a second arrangement state in which the object is arranged at the corresponding measurement site, calculates a phase difference between the object light beam and the reference light beam of the non-interference light beam for the object based on the intensities of the interference light beams for the non-interference light beam corrected by the light intensity correcting unit and the error in the phase difference calculated by the phase shift error calculating unit.

11. The shape determining device according to claim 10, wherein, in each of the first and second homodyne interferometers, in the third optical system, for each non-interference light beam acquired by the first optical system, among the four branched non-interference light beams obtained by branching by the second optical system, phase differences of $-90°$, $+90°$, and $+180°$ are respectively set to three of the branched non-interference light beams, each branched non-interference light beam to which a phase difference is set serving as a source of a non-reference interference light beam relative to the fourth branched non-interference light beam serving as a source of a reference interference light beam, and wherein the phase difference calculating unit, for each non-interference light beam acquired by the first optical system, inputs to a set of equations (A1) an intensity $I2'$ of the reference interference light beam and intensities $I1'$, $I3'$, and $I4'$ of the three non-reference interference light beams as well as errors $\epsilon1$, $\epsilon3$, and $\epsilon4$ of the phase differences of the three non-reference interference light beams, and thereby calculates a phase difference $\phi$ between the object light beam and the reference light beam in the object, where the equations A1 are:

$$\left. \begin{array}{l} \phi' = \tan^{-1}\left(\dfrac{I2' - I4'}{I3' - I1'}\right) \\ \phi = \tan^{-1}\left(\dfrac{\sin\phi' \cdot \{\cos(\epsilon1) + \cos(\epsilon3)\} - \cos(\phi') \cdot \sin(\epsilon4)}{\sin\phi' \cdot \{\sin(\epsilon1) + \sin(\epsilon3)\} + \cos\phi' \cdot \{1 + \cos(\epsilon4)\}}\right) \end{array} \right\}. \quad (A1)$$

12. The shape determining device according to claim 10, further comprising a polarizing plate holding angle adjusting unit that, as for the detected intensities obtained by the interference light intensity detecting unit of each of the first and second homodyne interferometers in a state that the optical path length of the corresponding object light beam or the corresponding reference light beam of each non-interference light beam acquired by the first optical system of the homodyne interferometer is maintained at a constant length in the first arrangement state, adjusts the angle at which each of the polarizing plates is held in the polarizing plate holding unit such that a detected intensity of the corresponding reference light beam at a time that the corresponding object light beam is blocked by the light beam blocking unit and a detected intensity of the corresponding object light beam at a time that the corresponding reference light beam is blocked by the light beam blocking unit agree with each other.

13. The shape determining device according to claim 1, wherein the second optical system of each of the first and second homodyne interferometers branches each non-interference light beam acquired by the first optical system of the homodyne interferometer into four branched non-interference light beams, wherein the third optical system of each of the first and second homodyne interferometers generates a diverse phase difference between the polarization component of the corresponding reference light beam and the polarization component of the corresponding object light beam in each of the four branched light beams of each non-interference light beam acquired by the second optical system of the homodyne interferometer, wherein the fourth optical system of each of the first and second homodyne interferometers is four polarizing plates each of which extracts an interference light beam between the reference light beam and the object light beam from each of the four branched light beams of each non-interference light beam acquired by the first optical system of the homodyne interferometer having passed through the third optical system of the homodyne interferometer, wherein the interference light intensity detecting unit of each of the first and second homodyne interferometers detects the intensity of each of the four interference light beams extracted for each non-interference light beam acquired by the first optical system of the homodyne interferometer by the four polarizing plates of the fourth optical system of the homodyne interferometer, and wherein the shape determining device further comprises:

a light intensity correcting unit that performs correction independently onto each of the four light intensities acquired by the light intensity detecting unit of each of the first and second homodyne interferometers for each non-interference light beam acquired by the first optical system of the homodyne interferometer;

a light beam blocking unit that blocks each of the object light beam and the reference light beam of each non-interference light beam acquired by the first optical system of each of the first and second homodyne interferometers;

a gain setting unit that sets up a correction gain for the light intensity correcting unit such that, when an optical path length of the object light beam of each non-interference light beam acquired by the first optical system of each of the first and second homodyne interferometers is maintained at a constant level and the reference light beam of the non-interference light beam is blocked by the light beam blocking unit in a first arrangement state in which the object for calibration is arranged at the corresponding measurement site for the non-interference light beam, intensities of the four object light beams acquired by the light intensity correcting unit for the non-interference light beam agree with each other;

an offset correction value setting unit that sets up, for each non-interference light beam acquired by the first optical system of each of the first and second homodyne interferometers, as offset correction values for the light intensity correcting unit, intensities of the four reference light beams acquired by the light intensity correcting unit for the non-interference light beam when an optical path length of the reference light beam of the non-interference light beam is maintained at a constant level and the object light beam for the non-interference light beam is blocked by the light beam blocking unit in the first arrangement state;

a phase shift error calculating unit that, when a time series of fluctuations is imparted to the optical path length of the object light beam or the reference light beam of each non-interference light beam acquired by the first optical system of each of the first and second homodyne interferometers in the first arrangement state, calculates an error in the phase difference generated by the third optical system of the homodyne interferometer based on the intensities of the four interference light beams for the non-interference light beam corrected by the light intensity correcting unit a second phase difference calculating unit that, for each non-interference light beam acquired by the first optical system of each of the first and second homodyne interferometers, in a second arrangement state in which the object is arranged at the corresponding measurement site, calculates a phase difference between the object light beam and the reference light beam of the non-interference light beam for the object based on the intensities the four interference light beams for the non-interference light beam corrected by the light intensity correcting unit and the error in the phase difference calculated for the non-interference light beam by the phase shift error calculating unit.

14. The shape determining device according to claim 13, wherein, in each of the first and second homodyne interferometers, in the third optical system, for each non-interference light beam acquired by the first optical system, among the four branched non-interference light beams obtained by branching by the second optical system, phase differences of $-90°$, $+90°$, and $+180°$ are respectively set to three of the branched non-interference light beams with each branched non-interference light beam to which a phase difference is set serving as a source of a non-reference interference light beam relative to the fourth branched non-interference light beam serving as a source of a reference interference light beam, and wherein the phase difference calculating unit, for each non-interference light beam acquired by the first optical system, inputs to a set of equations (A2) an intensity $I2''$ of the reference interference light beam and intensities $I1''$, $I3''$, and $I4''$ of the three non-reference interference light beams as well as errors $\epsilon1$, $\epsilon3$, and $\epsilon4$ of the phase differences of the three non-reference interference light beams and the offset correction values $ar1$, $ar2$, $ar3$, and $ar4$ set up by the offset correction value setting unit, and thereby calculates a phase difference $\phi$ between the object light beam and the reference light beam in the object, where the equations A2 are:

$$Z = \frac{I2'' - I4''}{I3'' - I1''} \quad \text{(A2)}$$

$$\phi = \tan^{-1}\left( \frac{\sqrt{ar4} \cdot \sin(\varepsilon 4) - Z \cdot (-\sqrt{ar3} \cdot \cos(\varepsilon 3) + \sqrt{ar1} \cdot \cos(\varepsilon 1)}{Z \cdot \{-\sqrt{ar3} \cdot \sin(\varepsilon 3) - \sqrt{ar1} \cdot \sin(\varepsilon 1)\} - \sqrt{ar2} - \cos(\varepsilon 4)} \right)$$

15. The shape determining device according to claim 2, wherein in each of the first and second homodyne interferometers, optical path lengths of the branched non-interference light beams obtained by branching from each non-interference light beam acquired from the first optical system of the homodyne interferometer is set identical.

* * * * *